(12) United States Patent
Gao et al.

(10) Patent No.: US 11,422,861 B2
(45) Date of Patent: Aug. 23, 2022

(54) DATA PROCESSING METHOD AND COMPUTER DEVICE

(71) Applicant: Huawei Technologies Co., Ltd., Shenzhen (CN)

(72) Inventors: Xiong Gao, Hangzhou (CN); Wei Li, Shanghai (CN); Ming Zheng, Shanghai (CN); Hou Fun Lam, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 78 days.

(21) Appl. No.: 17/107,173

(22) Filed: Nov. 30, 2020

(65) Prior Publication Data

US 2021/0081249 A1 Mar. 18, 2021

Related U.S. Application Data

(63) Continuation of application No. PCT/CN2019/087923, filed on May 22, 2019.

(30) Foreign Application Priority Data

May 29, 2018 (CN) .......................... 201810571788.X

(51) Int. Cl.
*G06F 9/50* (2006.01)
*G06F 9/48* (2006.01)
*G06F 13/28* (2006.01)

(52) U.S. Cl.
CPC .............. *G06F 9/5016* (2013.01); *G06F 9/48* (2013.01); *G06F 9/4806* (2013.01);
(Continued)

(58) Field of Classification Search
CPC ........ G06F 9/50; G06F 9/5016; G06F 9/5022; G06F 9/5038; G06F 9/48; G06F 9/4806;
(Continued)

(56) References Cited

U.S. PATENT DOCUMENTS 7,779,173 B2* 8/2010 Archer .................... G06F 13/28
710/22
9,111,368 B1 8/2015 Karandikar et al.
(Continued)

FOREIGN PATENT DOCUMENTS

| CN | 103399825 A | 11/2013 |
|---|---|---|
| CN | 105550028 A | 5/2016 |
| CN | 107544844 A | 1/2018 |

*Primary Examiner* — Charles M Swift
(74) *Attorney, Agent, or Firm* — Conley Rose, P.C.

(57) ABSTRACT

A data processing method implemented by a computer device, includes generating a target task including a buffer application task or a buffer release task, when the target task is the buffer application task, a first buffer corresponding to the buffer application task is used when the second task is executed, or when the target task is the buffer release task, a second buffer corresponding to the buffer release task is used when the first task is executed, obtaining a buffer entry corresponding to the target task after a preceding task of the target task is executed and before a successive task of the target task is executed, where the buffer entry includes a memory size of a buffer corresponding to the target task, a memory location of the buffer, and a memory address of the buffer, and executing the target task to apply for or release the buffer.

20 Claims, 16 Drawing Sheets

(52) U.S. Cl.
CPC .......... *G06F 9/4843* (2013.01); *G06F 9/4881* (2013.01); *G06F 9/50* (2013.01); *G06F 9/5022* (2013.01); *G06F 9/5038* (2013.01); *G06F 13/28* (2013.01)

(58) Field of Classification Search
CPC ...... G06F 9/4843; G06F 9/4881; G06F 13/28; G06F 2209/84; G06F 2209/5011
See application file for complete search history.

(56) References Cited

U.S. PATENT DOCUMENTS

| | | |
|---|---|---|
| 2004/0268354 A1 | 12/2004 | Kanai et al. |
| 2008/0250409 A1 | 10/2008 | Ohgishi |
| 2009/0271790 A1* | 10/2009 | Williams .............. G06F 9/3836 718/100 |
| 2011/0246728 A1 | 10/2011 | Maruyama |
| 2012/0102243 A1* | 4/2012 | Glaeser .................. G06F 13/28 710/53 |
| 2019/0236828 A1* | 8/2019 | Hakura ................ G06F 9/4881 |

* cited by examiner

DATA PROCESSING METHOD AND COMPUTER DEVICE

CROSS-REFERENCE TO RELATED APPLICATIONS

This application is a continuation of International Patent Application No. PCT/CN2019/087923 filed on May 22, 2019, which claims priority to Chinese Patent Application No. 201810571788.X filed on May 29, 2018. The disclosures of the aforementioned applications are hereby incorporated by reference in their entireties.

TECHNICAL FIELD

This application relates to the field of communications technologies, and in particular, to a data processing method and a computer device.

BACKGROUND

A storage system is a system that includes various storage devices that store programs and data, a control component, and hardware and software that manage information scheduling. In a running process of an application program, memory allocation and release are related.

Currently, with development of data-intensive applications such as artificial intelligence and a big video, heterogeneous computing represented by graphics processing gains wide application and attention. Memory allocation and release are related in a process of heterogeneous computing. Currently, in a heterogeneous task, data is exchanged based on a device memory and the exchanged data in the data memory is managed through a buffer management module in a computer device. A specific process is as follows. The computer device applies for a request for a buffer through an application routine module, then, the buffer management module synchronously applies for a device memory corresponding to the buffer, then, the computer device initiates a dependent task depending on the buffer through the application routine module, and then, the computer device calls a corresponding module in the computer device based on the dependent task through a task scheduler, to enable the corresponding module to execute the dependent task, further, the application routine module synchronously keeps waiting until the dependent task is executed, and the application routine module sends a request for releasing the buffer to the buffer management module, and finally, the buffer management module releases, based on the request, the device memory corresponding to the buffer.

However, in the manner in which the data is exchanged based on the device memory and the exchanged data in the data memory is managed through the buffer management module in the computer device, the buffer is applied for in advance before the dependent task is initiated. Therefore, during a period from a moment at which the computer device initiates the dependent task through the application routine module to a moment at which the dependent task is executed, the buffer that is applied for by the computer device through the buffer management module is in an idle state. In addition, the buffer is released only after the dependent task is executed, and before the execution of the dependent task, the application routine module synchronously keeps waiting. During a period from a point at which the dependent task has been executed to a point at which the application routine module in the computer device synchronously returns, the buffer that is applied for by the computer device through the buffer management module is in the idle state. Consequently, utilization of the device memory corresponding to the buffer that is applied for is low.

SUMMARY

Embodiments of this application provide a data processing method and a computer device, to improve utilization of a device memory corresponding to a buffer.

A first aspect of the embodiments of this application provides a data processing method and includes the following steps.

In a running process, a computer device calls an application programming interface of the computer device, and then generates a target task based on a parameter generated when the computer device calls the application programming interface, where the target task may include a buffer application task or a buffer release task, the target task is a successive task of a first task and is a preceding task of a second task, the first task and the second task are to-be-executed tasks between which there is a sequential dependency relationship, and when the target task is the buffer application task, a buffer corresponding to the buffer application task may be used when the second task is executed, or when the target task is the buffer release task, a buffer corresponding to the buffer release task may be used when the first task is executed. Then, after a preceding task of the target task is executed and before a successive task of the target task is executed, the computer device may obtain, based on the target task, a buffer entry corresponding to the target task, where the buffer entry is an entry including a memory size of a buffer corresponding to the target task, a memory location of the buffer, and a memory address of the buffer. And then, the computer device may execute the target task to apply for or release the buffer corresponding to the target task.

In this embodiment, before the computer device applies for the buffer or releases the buffer, the computer device may determine to execute the target task only after the preceding task of the target task is executed and before the successive task of the target task is executed. Therefore, the computer device may apply for the buffer after the preceding task of the target task is executed and before the successive task of the target task is executed, and the computer device may release the buffer immediately after the preceding task of the target task is executed, where a moment at which the buffer is applied for is postponed and a moment at which the buffer is released is advanced in comparison with the other approaches solution. This improves utilization of a device memory corresponding to the buffer.

In a possible implementation, the target task may include a memory identity (ID) of the buffer corresponding to the target task. That the computer device obtains, based on the target task, a buffer entry corresponding to the target task may include that the computer device obtains, based on the memory ID, the buffer entry corresponding to the target task. In the possible implementation, a specific manner of obtaining the buffer entry corresponding to the target task by the computer device is provided. In actual application, this improves implementability and practicability of the solution.

In another possible implementation, the target task may be the buffer application task. That the computer device executes the target task to apply for or release the buffer of the target task may include the following. First, the computer device may determine the memory size of the buffer and the memory location of the buffer from the buffer entry. Then, the computer device may determine a corresponding device memory for the buffer based on the memory size of the buffer and the memory location of the buffer. The computer device may update the memory address of the buffer in the buffer entry based on the device memory. In this possible implementation, a specific manner of executing the buffer application task by the computer device is provided. In actual application, this improves executability of the solution.

In another possible implementation, the target task may be the buffer release task. That the computer device executes the target task to apply for or release the buffer of the target task may include the following. First, the computer device may determine, from the buffer entry, the memory address of the buffer corresponding to the target task, and then the computer device may release a device memory corresponding to the memory address of the buffer, and then delete the buffer entry. In this possible implementation, a specific manner of executing the buffer release task by the computer device is provided. In actual application, this improves operability and integrity of the solution.

In another possible implementation, the target task may include a dependent task group ID. That the computer device obtains, based on the target task, a buffer entry corresponding to the target task may include that the computer device obtains, based on the dependent task group ID, the buffer entry corresponding to the target task. In this possible implementation, another manner of obtaining the buffer entry corresponding to the target task by the computer device is provided. In actual application, this improves implementability and diversity of the solution.

In another possible implementation, the target task may be the buffer application task. That the computer device executes the target task to apply for or release the buffer of the target task may include the following. First, the computer device may determine whether the memory location that is of the buffer corresponding to the target task and that is in the buffer entry is located in a local memory, and if the memory location of the buffer is located in the local memory, the computer device may determine a target local memory according to a preset policy, and then the computer device may update the memory address of the buffer and the memory location of the buffer in the buffer entry based on the target local memory, or if the memory location of the buffer is not located in the local memory, the computer device may set the memory location of the buffer to a global memory, and then the computer device may update the memory address of the buffer and the memory location of the buffer in the buffer entry based on the global memory. In this possible implementation, another manner of executing the buffer application task by the computer device is provided. In actual application, this increases diversity and practicability of the solution.

In another possible implementation, the target task may be the buffer release task. That the computer device executes the target task to apply for or release the buffer corresponding to the target task may include the following. First, the computer device may determine, the memory address that is of the buffer corresponding to the target task and that is in the buffer entry, and then the computer device may release a device memory corresponding to the memory address of the buffer, and set the memory address of the buffer in the buffer entry to a null address. In this possible implementation, another manner of executing the buffer release task by the computer device is provided. In an actual application process, this improves diversity and practicability of the solution.

In another possible implementation, the target task may be the buffer application task. After the computer device obtains, based on the target task, the buffer entry corresponding to the target task, and executes the target task to apply for or release the buffer corresponding to the target task, the method may further include the following. First, the computer device may determine that preloaded data exists, and then, the computer device may generate a task for copying the preloaded data, and then execute the task for copying the preloaded data. In this possible implementation, after executing the buffer application task, the computer device may further determine that the preloaded data exists, and then copy the preloaded data to a target location. Therefore, in an actual application process, this improves completeness and operability of the solution.

In another possible implementation, the target task may be the buffer release task. After the computer device obtains, based on the target task, the buffer entry corresponding to the target task, and executes the target task to apply for or release the buffer corresponding to the target task, the method may further include the following. First, the computer device may determine that prestored data exists, and then the computer device may generate a task for copying the prestored data, and then execute the task for copying the prestored data. In this possible implementation, before executing the buffer release task, the computer device may determine that the prestored data exists, and then copy the prestored data to a target location. Therefore, in an actual application process, this improves integrity and practicability.

In another possible implementation, if the target task is a memory copy task, a data copy source address that corresponds to the memory copy task and that is carried in the target task is a valid memory ID and/or a data copy destination address that corresponds to the memory copy task and that is carried in the target task is a valid memory ID, the method may further include the following. First, the computer device may obtain, based on the memory ID, a buffer entry corresponding to the memory ID, and then the computer device may replace the memory ID carried in the target task with the memory address of the buffer in the buffer entry, and execute the memory copy task. In this possible implementation, when the target task is the memory copy task, and the memory copy task carries the valid memory ID, a specific manner of executing the memory copy task by the computer device is provided. In an actual application process, this improves implementability and integrity of the solution.

In another possible implementation, if the target task is a heterogeneous computing task, and an input parameter of the target task includes a valid memory ID, the method may include the following. First, the computer device may obtain, based on the memory ID, a buffer entry corresponding to the memory ID, then, the computer device may replace the memory ID in the input parameter with the memory address of the buffer in the buffer entry, and then, the computer device may determine whether a buffer memory location corresponding to the memory ID is located in a local memory, and if the buffer memory location corresponding to the memory ID is located in the local memory, the computer device may execute the heterogeneous computing task based on the local memory. In this possible implementation, when the target task is the heterogeneous computing task and the heterogeneous computing task includes the valid memory ID, a specific process of executing the heterogeneous computing task by the computer device is provided. In addition, the computer device may execute the heterogeneous computing task based on the local memory through a task scheduler. Because access performance of the local memory is better than access performance of a global memory, data is read or written more efficiently when the computer device executes the heterogeneous computing task. According to the data processing method in this application, this fully uses higher access performance of the local memory, meets diversified device memory application scenarios, and improves implementability and practicability of the solution in an actual application process.

In another possible implementation, if the target task is a heterogeneous computing task, and the target task includes a dependent task group ID, the method may further include the following. First, the computer device may obtain a buffer entry corresponding to the dependent task group ID, then, the computer device may determine that a buffer memory location in the buffer entry is located in a local memory, the computer device sets a buffer memory address in the buffer entry as an implicit parameter of the heterogeneous computing task, and the computer device executes the heterogeneous computing task based on the local memory. In this possible implementation, when the target task is the heterogeneous computing task, and the heterogeneous computing task carries the dependent task group ID, another specific process of executing the heterogeneous computing task by the computer device is provided. The computer device may execute the heterogeneous computing task based on the local memory through a task scheduler. Because access performance of the local memory is better than access performance of a global memory, data is read or written more efficiently when the computer device executes the heterogeneous computing task. According to the data processing method in this application, this fully uses higher access performance of the local memory, meets diversified device memory application scenarios, and improves diversity and practicability of the solution in an actual application process.

In another possible implementation, after the computer device obtains, based on the target task, the buffer entry corresponding to the target task, and executes the target task to apply for or release the buffer corresponding to the target task, the method may further include that the computer device may remove a dependency relationship between the target task and a task depending on the target task. In this possible implementation, after executing the target task, the computer device may remove the dependency relationship between the dependent task and the target task. In actual application, a specific manner of determining execution statuses of the preceding task and the successive task of the target task by the computer device. This improves implementability of the solution.

In another possible implementation, the target task may be the buffer application task. That the computer device generates the target task may include the following. First, the computer device may apply for the buffer entry for the buffer corresponding to the target task and the memory ID corresponding to the buffer entry, then, the computer device may fill in the buffer entry based on the application programming interface parameter, where the application programming interface parameter is a parameter generated when the computer device calls an application programming interface of the computer device, and the buffer memory address in the buffer entry is a null address, and then, the computer device may generate the buffer application task based on the buffer entry, where the buffer application task includes the memory ID corresponding to the buffer entry. In this possible implementation, a specific manner of generating the target task by the computer device is provided. In actual application, this improves implementability of the solution.

In another possible implementation, the target task may be the buffer application task. That the computer device generates the target task may include the following. First, the computer device may fill in, based on an application programming interface parameter, a buffer entry corresponding to a dependent task group ID, where the application programming interface parameter is a parameter generated when the computer device calls an application programming interface of the computer device, and the buffer memory address in the buffer entry is a null address, and then, the computer device may generate the buffer application task based on the buffer entry, where the buffer application task includes the dependent task group ID. In this possible implementation, another specific manner of generating the target task by the computer device is provided. In actual application, this improves diversity and practicability of the solution.

In another possible implementation, the target task may be the buffer release task, and the buffer release task includes a memory ID of the buffer corresponding to the buffer release task. In this possible implementation, the buffer release task carries the memory ID of the buffer corresponding to the buffer release task such that the computer device subsequently executes the buffer release task based on the memory ID. In an actual application process, this improves implementability of the solution.

In another possible implementation, the target task may be the buffer release task, and the buffer release task includes a dependent task group ID of the buffer corresponding to the buffer release task. In this possible implementation, the buffer release task carries the dependent task group ID of the buffer corresponding to the buffer release task such that the computer device subsequently executes the buffer release task based on the dependent task group ID. In an actual application process, this improves diversity and implementability of the solution.

In another possible implementation, the target task is the buffer application task. That the computer device generates the target task may include the following. First, the computer device may determine that the heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, and then, the computer device may fill in, based on the related information of the buffer, a buffer entry corresponding to the heterogeneous computing task, and generate the buffer application task based on the buffer entry. In this possible implementation, the computer device may generate the buffer application task based on the information carried in the heterogeneous computing task, and another manner of generating the buffer application task by the computer device is provided. In an actual application process, this improves diversity of the solution In another possible implementation, the target task may be the buffer release task. That the computer device generates the target task may include the following. First, the computer device may determine that the heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, and then, the computer device may obtain the buffer entry corresponding to the target task, and generate the buffer release task based on the buffer entry. In this possible implementation, another manner of generating the buffer release task by the computer device is provided. In actual application, this improves diversity of the solution.

In another possible implementation, the heterogeneous computing task may include related information of preloaded data, and the related information of the preloaded data may include a source address of the preloaded data, a length of the preloaded data, and an offset address of the preloaded data in the buffer. After the computer device obtains, based on the target task, the buffer entry corresponding to the target task, and executes the target task to apply for or release the buffer corresponding to the target task, the method may further include that the computer device may generate, based on the related information of the preloaded data, a task for copying the preloaded data, and then execute the task for copying the preloaded data. In this possible implementation, another method for determining the preloaded data and executing the task for copying the preloaded data to a target location by the computer device is provided. In actual application, this improves diversity of the solution.

In another possible implementation, the heterogeneous computing task may further include related information of prestored data, and the related information of the prestored data may include a storage address of the prestored data, a length of the prestored data, and an offset address of the prestored data in the buffer. After the computer device obtains, based on the target task, the buffer entry corresponding to the target task, and executes the target task to apply for or release the buffer corresponding to the target task, the method may further include the following. First, the computer device may generate, based on the related information of the prestored data, a task for copying the prestored data, and then, the computer device executes the task for copying the prestored data. In this possible implementation, another method for determining the prestored data and executing the task for copying the prestored data to a target location by the computer device is provided. In actual application, this improves diversity and practicability of the solution.

In another possible implementation, before the computer device determines that the heterogeneous computing task carries the related information of the buffer corresponding to the target task, the method may further include that the computer device may fill in, based on an application programming interface parameter, the buffer entry corresponding to the heterogeneous computing task, where the application programming interface parameter is a parameter generated when the computer device calls an application programming interface of the computer device, and then, the computer device may generate the heterogeneous computing task based on the buffer entry, where the heterogeneous computing task includes the related information of the buffer corresponding to the heterogeneous computing task. In this possible implementation, a specific manner of generating the heterogeneous computing task by the computer device is provided. In an actual application process, this improves implementability and integrity of the solution.

A second aspect of the embodiments of this application provides a computer device. The computer device has a function of implementing an action of the computer device in the first aspect. The function may be implemented by hardware, or may be implemented by hardware by executing corresponding software. The hardware or the software includes one or more modules corresponding to the function.

A third aspect of the embodiments of this application provides a computer device. The computer device includes a processor, a memory, an input/output device, and a bus. The processor, the memory, and the input/output device all are connected to the bus. The memory stores a computer instruction. When the processor executes the computer instruction in the memory, the memory stores the computer instruction. When executing the computer instruction in the memory, the processor is configured to implement the method in any implementation of the first aspect.

A fourth aspect of the embodiments of this application provides a chip system. The chip system includes a processor configured to support a network device to implement a related function in the first aspect, for example, sending or processing related data and/or information in the foregoing method. In a possible design, the chip system further includes a memory, and the memory is configured to store a program instruction and data that are necessary for the network device. The chip system may include a chip, or may include a chip and another discrete component.

A fifth aspect of the embodiments of this application provides a computer program product including an instruction. When the computer program product runs on a computer, the computer is enabled to perform any implementation in the first aspect.

A sixth aspect of the embodiments of this application provides a computer-readable storage medium including an instruction. When the instruction is run on a computer, the computer is enabled to perform any implementation in the first aspect.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some rather than all of the embodiments of the present disclosure.

In the specification, claims, and accompanying drawings of the present disclosure, the terms "first", "second", "third", "fourth", and the like (if existent) are intended to distinguish between similar objects but do not necessarily indicate a specific order or sequence. It should be understood that the data termed in such a way are interchangeable in proper circumstances such that the embodiments of the present disclosure described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those units, but may include other units not expressly listed or inherent to such a process, method, system, product, or device.

The embodiments of this application provide a data processing method and a computer device, to improve utilization of a device memory corresponding to a buffer.

Figure 1A:
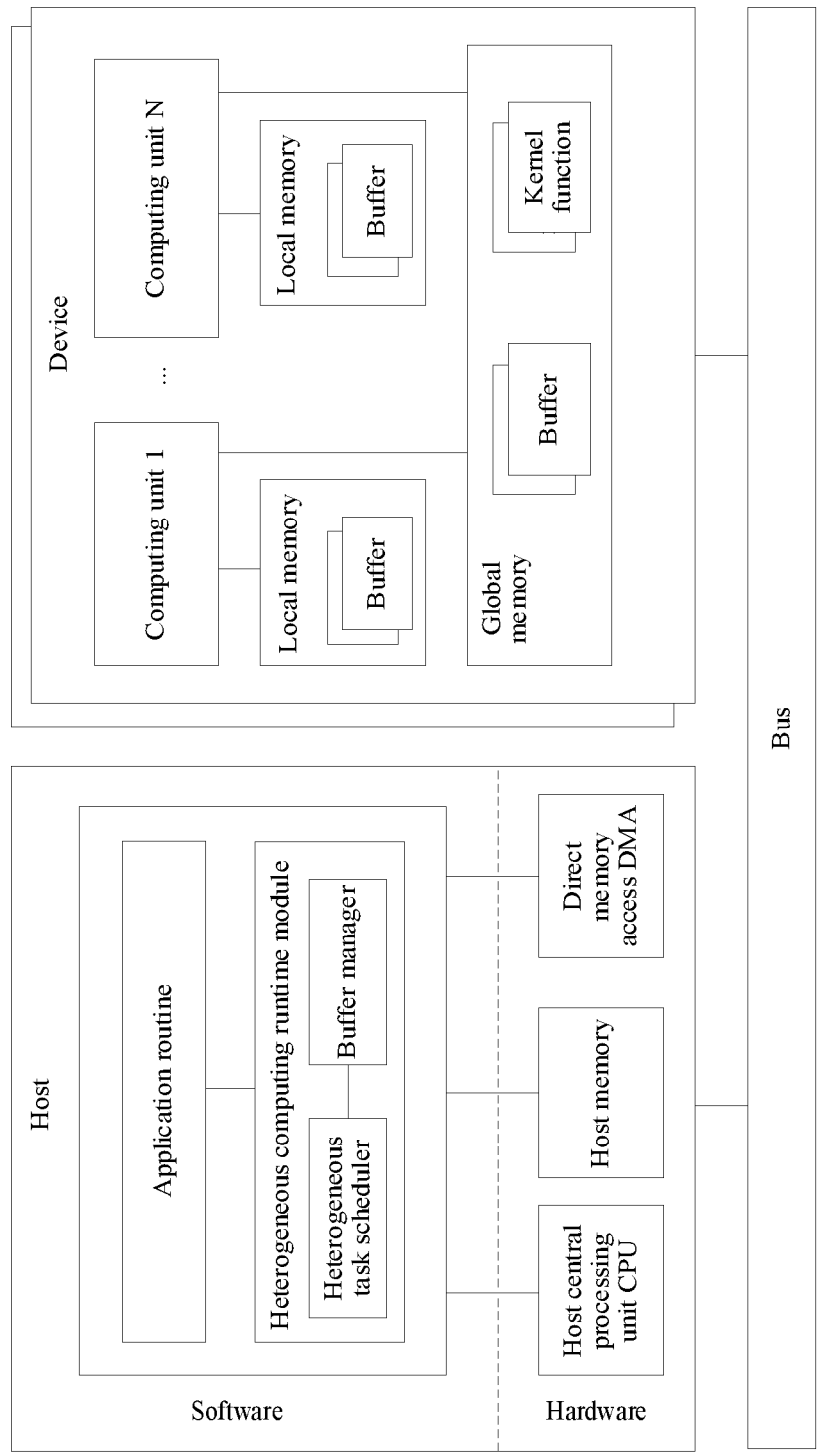
FIG. 1A is a schematic diagram of a system framework of an application scenario according to an embodiment of this application.

FIG. 1A is a schematic diagram of a system framework of an application scenario according to an embodiment of this application. FIG. 1A shows a system architecture of a computer device according to this embodiment of this application. The computer device may be a heterogeneous computing system architecture, or may be a homogeneous computing system architecture. This is not limited in this application. The following uses only the heterogeneous computing system architecture in FIG. 1A as an example for description. The computer device includes a host system and a slave system. The host system and the slave system are connected through a bus. The bus is configured to connect the host system and the slave system, to support a function such as direct data access between the host system and the slave system. The host system includes hardware modules such as a central processing unit (CPU), a host memory, and a direct memory access (DMA) module, and software modules such as a heterogeneous computing runtime module and an application routine module. The CPU is configured to execute programs of the heterogeneous computing runtime module and the application routine module. The host memory is configured to store program code executed in the CPU, and the like. The DMA is configured to copy data during data exchange in the heterogeneous computing system. The slave system includes a device computing unit and a memory apparatus. The memory unit includes a local device memory and a global device memory. The computing unit is configured to execute a heterogeneous computing task. The local device memory is a memory area that is accessed through reading/writing by a computing unit corresponding to the local memory. The global device memory is a memory area that can be accessed through reading/writing by all computing units in the slave system. The heterogeneous computing runtime module is configured to provide a software programming control interface for device heterogeneous computing and a related function, for example, an interface used for data copy between the host memory and the global device memory and initiation of a heterogeneous task. The application routine module is configured to call an application programming interface of the heterogeneous computing runtime module to perform heterogeneous programming, to meet a computing requirement in a specified field.

In the heterogeneous computing system architecture, heterogeneous task data is exchanged based on the global device memory currently. Because a mechanism for synchronous buffer application and asynchronous buffer use is used in the other approaches, utilization of a device memory corresponding to a buffer is low. Therefore, this application provides a data processing method, to improve the utilization of the device memory corresponding to the buffer.

Figure 1B:
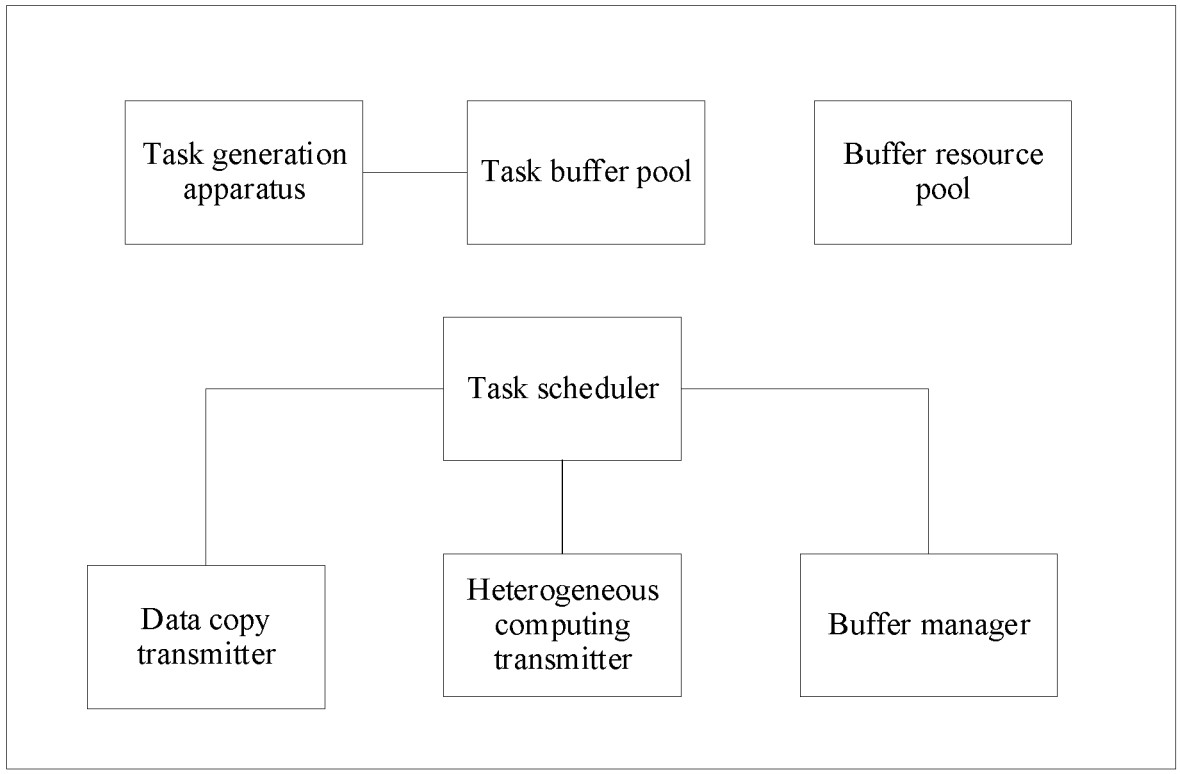
FIG. 1B is a schematic diagram of an application scenario of a data processing method according to an embodiment of this application.

The heterogeneous computing runtime module in the computer device is connected to the application routine module in the computer device. The heterogeneous computing runtime module in the computer device includes a plurality of submodules. For details, refer to FIG. 1B. FIG. 1B shows a task generation apparatus, a task buffer pool, a task scheduler, a data copy transmitter, a heterogeneous computing transmitter, a buffer manager, and a buffer resource pool that are included in the heterogeneous computing runtime module.

The task generation apparatus is configured to generate a corresponding task by calling a returned application programming interface parameter through the application routine module, and then place the generated task in the task buffer pool. The task buffer pool is configured to receive and buffer the task generated by the task generation apparatus based on the application programming interface parameter input by the application routine module, where the task may include a data copy task, a heterogeneous computing task, a buffer application task, a buffer release task, or the like. Each task includes information about another task on which the task depends.

The task scheduler is configured to select, from the task buffer pool, a task whose dependency relationship with another task has been removed, and schedule and submit the task to a corresponding module to perform a function such as executing the task. The data copy transmitter is configured to receive a data copy task dispatched by the task scheduler, and submit the data copy task to the DMA for data migration through a corresponding hardware driver. The heterogeneous computing transmitter is configured to receive a heterogeneous computing task dispatched by the task scheduler, and call a corresponding computing unit through the heterogeneous computing transmitter to execute the heterogeneous computing task.

The buffer manager is configured to receive a buffer application task or a buffer release task dispatched by the task scheduler, where a preceding task of the buffer application task or the buffer release task is executed, and a successive task of the buffer application task or the buffer release task is to be executed, and there is logically a sequential dependency relationship between the preceding task and the successive task, apply for or release a buffer for data exchange, and update the buffer resource pool. The buffer resource pool is configured to store related information of each buffer for the task scheduler to query for the related information of the buffer. The task scheduler dispatches the buffer application task or the buffer release task to the buffer manager. The task scheduler dispatches the buffer application task or the buffer release task to the buffer manager only after the preceding task of the buffer application task or the buffer release task is executed and the successive task of the buffer application task or the buffer release task is to be executed. This improves utilization of a device memory corresponding to the buffer.

For ease of understanding, the following explains and describes "key words" in the embodiments of this application.

Preceding task: A specific task or some tasks can be executed only after a task is executed. There is logically a sequential dependency relationship between the specific task or some tasks and the task. The task is a preceding task of the specific task. For example, the preceding task is a data copy task, the specific task is a heterogeneous computing task, and when the heterogeneous computing task is executed, data needs to be copied to a target address in the data copy task. Therefore, the data copy task is a preceding task of the heterogeneous computing task. For another example, a task is a buffer release task, and a buffer corresponding to the buffer release task needs to be used to execute the heterogeneous computing task. Therefore, it can be learned that the heterogeneous computing task is a preceding task of the buffer release task.

Successive task: It is assumed that a first task can be executed only after a second task is executed, and that there is logically a sequential dependency relationship between the first task and the second task. Therefore, the first task is a successive task of the second task. For example, the first task is a buffer release task, the first task is a heterogeneous computing task, and execution of the heterogeneous computing task depends on a buffer corresponding to the buffer release task. Therefore, it can be learned that the buffer release task can be executed only after the heterogeneous computing task is executed. Therefore, the heterogeneous computing task is a successive task of the buffer release task.

Sequential dependency relationship: There is logically a sequential relationship between tasks during execution. For example, execution of a heterogeneous computing task depends on a memory a buffer application task. In this case, there is a sequential dependency relationship between the buffer application task and the heterogeneous computing task.

Target task: The target task is a task whose preceding task is executed and whose successive task is to be executed. There is a sequential dependency relationship between the preceding task and the successive task. For example, the target task is a buffer application task, a successive task of the target task is a heterogeneous computing task, a preceding task of the target task is a memory copy task, and execution of the heterogeneous computing task needs to use a memory corresponding to a buffer, and the buffer application task can be executed only after the memory copy task is executed. Therefore, the memory copy task is a preceding task of the buffer application task, and the heterogeneous computing task can be executed only after the buffer has been applied for.

Buffer resource pool: The buffer resource pool is a data table used to store related information of each buffer. The related information of the buffer includes a memory size of the buffer, a memory address of the buffer, a memory location of the buffer, and the like.

Dependent task group: The dependent task group includes a plurality of tasks specified by the application routine module, where there is logically a sequential dependency relationship between the tasks.

Figure 2:
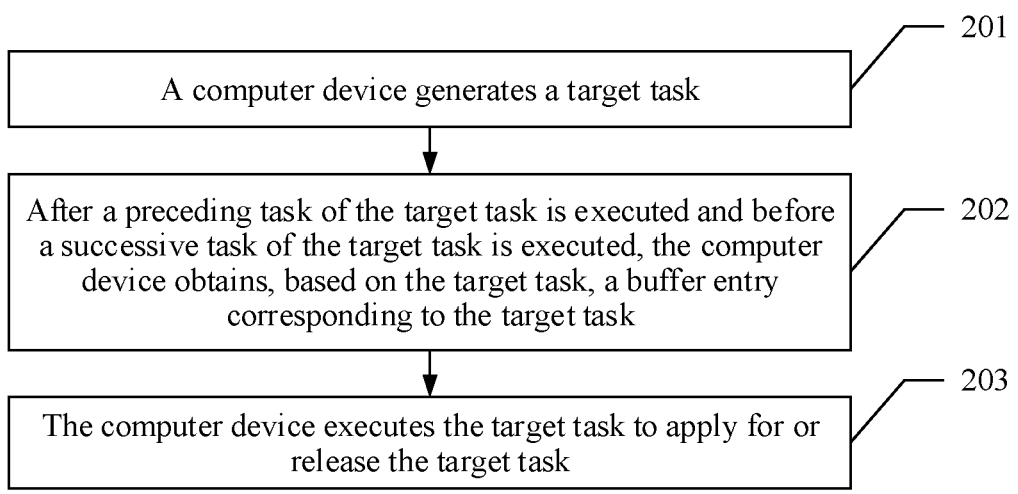
FIG. 2 is a schematic diagram of an embodiment of a data processing method according to embodiments of this application.

The following describes the data processing method in the embodiments of this application from a perspective of a computer device. Referring to FIG. 2, an embodiment of the data processing method in the embodiments of this application includes the following steps.

201: The computer device generates a target task.

In a process in which the computer device runs code through an application routine module, the computer device calls an application programming interface of the computer device, then, the computer device inputs a corresponding parameter to the application programming interface of the computer device through the application routine module, and the computer device may generate the target task based on the parameter. The target task may include a buffer application task or a buffer release task. The target task is a successive task of a first task and is a preceding task of a second task. The first task and the second task are to-be-executed tasks between which there is a sequential dependency relationship. When the target task is the buffer application task, execution of the second task uses a buffer corresponding to the buffer application task. When the target task is the buffer release task, execution of the first task uses a buffer corresponding to the buffer release task.

It should be noted that, that the computer device generates a target task may be as follows. The computer device generates the target task based on the parameter that is input when the application routine module of the computer device calls the application programming interface of the computer device, or the computer device obtains a generated heterogeneous computing task, where a preceding task of the heterogeneous computing task is executed and a successive task of the heterogeneous computing task is to be executed, and the computer device may generate the target task based on related information of a buffer carried in the heterogeneous computing task. This is not limited in this application.

202: After a preceding task of the target task is executed and before a successive task of the target task is executed, the computer device obtains, based on the target task, a buffer entry corresponding to the target task.

After the computer device generates the target task, after the preceding task of the target task is executed and before the successive task of the target task is executed, the computer device may obtain, based on the target task, the buffer entry corresponding to the target task. Further, the computer device may obtain a buffer entry of a memory ID from a buffer resource pool in the computer device based on the memory ID of the buffer carried in the target task, or the computer device may obtain a buffer entry of a dependent task group ID from a buffer resource pool in the computer device based on the dependent task group ID carried in the target task, or the computer device may obtain a buffer entry corresponding to the heterogeneous computing task from a buffer resource pool in the computer device based on the heterogeneous computing task. This is not limited in this application.

203: The computer device executes the target task to apply for or release a buffer corresponding to the target task.

After obtaining the buffer entry, the computer device may execute the target task to apply for or release the buffer corresponding to the target task. Further, when the target task is the buffer application task, the computer device may determine a memory size and a memory location of the buffer based on the buffer entry, then apply for a corresponding device memory for the buffer based on the memory size and the memory location, and then fill in the buffer entry with a memory address of the device memory. When the target task is the buffer release task, the computer device may determine a device memory of the buffer based on the buffer entry, and then release the device memory corresponding to the buffer. After the computer device completes releasing the device memory corresponding to the buffer, the computer device may delete the buffer entry. When the target task is a task in a dependent task group, the computer device may set a memory address in the buffer entry to a null address. Further, a subsequent process of executing the target task may be determined based on a structure of the buffer resource pool.

In this embodiment of this application, the computer device generates the target task. The target task includes the buffer application task or the buffer release task. The target task is the successive task of the first task and is the preceding task of the second task. The first task and the second task are the to-be-executed tasks between which there is the sequential dependency relationship. When the target task is the buffer application task, execution of the second task uses the buffer corresponding to the buffer application task. When the target task is the buffer release task, execution of the first task uses the buffer corresponding to the buffer release task. After the preceding task of the target task is executed and before the successive task of the target task is executed, the computer device may obtain, based on the target task, the buffer entry corresponding to the target task, where the buffer entry is the entry including the memory size of the buffer corresponding to the target task, the memory location of the buffer, and the memory address of the buffer, and then the computer device executes the target task to apply for or release the buffer corresponding to the target task. Therefore, before the computer device applies for the buffer or releases the buffer, the computer device may determine to execute the target task only after the preceding task of the target task is executed and before the successive task of the target task is executed. Therefore, the computer device may apply for the buffer after the preceding task of the target task is executed and before the successive task of the target task is executed, and the computer device may release the buffer immediately after the preceding task of the target task is executed, where a moment at which the buffer is applied for is postponed and a moment at which the buffer is released is advanced in comparison with the other approaches solution. This improves utilization of a device memory corresponding to the buffer.

The following describes the data processing method in this embodiment of this application with reference to the modules of the heterogeneous operation module of the computer device in FIG. 1B. A process performed by each module of the computer device is described.

In this embodiment of this application, in a process of applying for a buffer, when the buffer manager in the computer device determines that a memory location of the buffer that needs to be applied for is located in a local memory, the buffer manager may determine a target local memory according to a preset policy. Further, the buffer manager may directly use the corresponding local memory as a memory address of the buffer, or the buffer manager may determine the target local memory based on a free status of the local memory or a load status of a computing unit corresponding to the local memory. This is not limited herein. In a subsequent embodiment, only an example in which the buffer manager determines the target local memory based on the load status of the computing unit and the free status of the local memory is used for description.

In this embodiment of this application, after the task scheduler in the computer device obtains the heterogeneous computing task, when the task scheduler determines, based on the heterogeneous computing task, that a memory location of a buffer corresponding to the heterogeneous computing task is not in the local memory, the task scheduler may select a target computing unit from computing units corresponding to a global memory to execute the heterogeneous computing task. Further, the task scheduler may select, based on load statuses of the computing units, a computing unit with least load to execute the heterogeneous computing task, or the task scheduler may select the target computing unit according to another policy. This is not limited herein. In a subsequent embodiment, only an example in which the task scheduler selects a computing unit with least load to execute the heterogeneous computing task is used for description.

In this embodiment of this application, a buffer entry in the buffer resource pool in the computer device may be a data table in a dimension of buffers. The application routine module in the computer device calls the application programming interface of the task generation apparatus in the computer device, and then inputs a corresponding application programming interface parameter into the task generation apparatus. For example, when the application routine module calls the task generation apparatus to initiate a buffer application task, the application routine module inputs a parameter for the buffer application task into the task generation apparatus. Then, the task generation apparatus may apply for the buffer entry in the buffer resource pool, fill in the buffer entry based on the application programming interface parameter, and create the buffer application task, where the buffer application task carries a memory ID of the buffer. Then, the task generation apparatus places the created buffer application task into the task buffer pool in the computer device, and returns the memory ID to the application routine module. Alternatively, the task generation apparatus creates a buffer release task in the buffer resource pool, and places the buffer release task into the task buffer pool, where the buffer release task includes the memory ID of the corresponding buffer. Therefore, the buffer manager may subsequently execute the buffer application task or the buffer release task based on the memory ID in information about the buffer application task. In addition, the buffer entry in the buffer resource pool may be a data table in a dimension of dependent task groups. The task generation apparatus applies for the buffer entry in the buffer resource pool, fills in the buffer entry based on the application programming interface parameter input when the application routine module calls the task generation apparatus, and creates a buffer application task, where the buffer application task carries a dependent task group ID. The task generation apparatus places the created buffer application task into the task buffer pool. Alternatively, the task generation apparatus creates a buffer release task in the buffer resource pool, and places the buffer release task into the task buffer pool, where the buffer release task includes the dependent task group ID. Therefore, the buffer manager may subsequently execute the buffer application task or the buffer release task based on the dependent task group ID in the buffer application task.

In this embodiment of this application, the sequential dependency relationship may be reflected in a plurality of manners. For example, in Manner 1, when the task generation apparatus in the computer device generates the target task, the target task carries a dependency relationship between tasks, where a principle of the dependency relationship is a consistent with a other approaches principle of a dependency relationship between tasks. In Manner 2, the task generation apparatus in the computer device generates the target task, the target task carries a corresponding identifier, and a task related to the target task is determined based on a type of the identifier. For example, a heterogeneous computing task carries an identifier 1, but a buffer application task carries an identifier 2, and in this case, a preset mechanism on the computer device is that there is logically an execution sequence between a task that carries the identifier 1 and a task that carries the identifier 2. This is not limited in this application. In a subsequent embodiment, only Manner 1 is used as an example for description.

In an embodiment of this application, the computer device may obtain, through the buffer manager, a corresponding buffer entry from the buffer resource pool in the computer device based on a memory ID of a buffer corresponding to a target task that is sent by the task scheduler in the computer device, and execute the target task based on the target task and the buffer entry. The target task is a buffer application task or a buffer release task. The following provides detailed descriptions with reference to FIG. 3A and FIG. 3B.

Figure 3A:
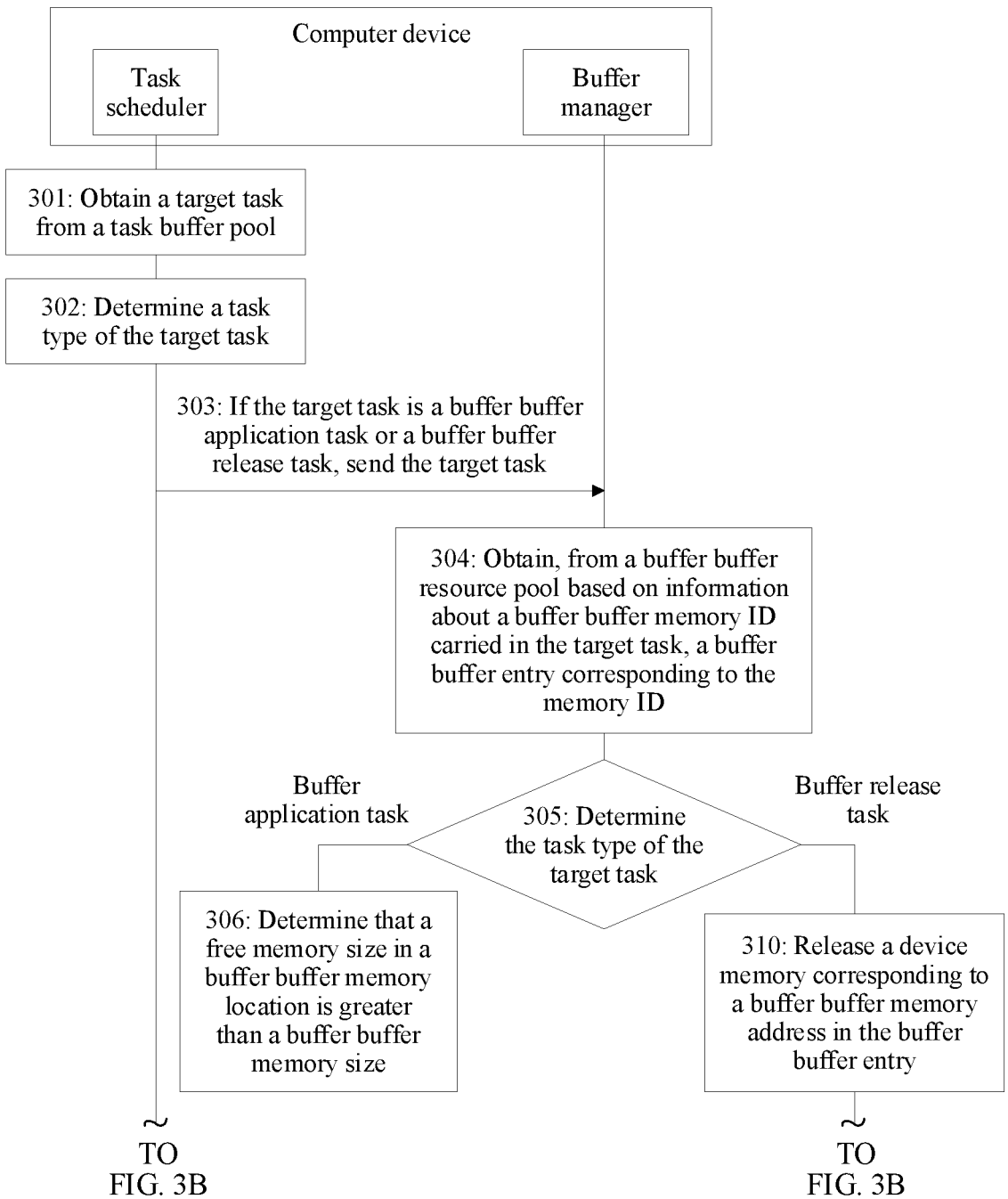
FIG. 3A and FIG. 3B are a schematic diagram of another embodiment of a data processing method according to embodiments of this application.
Figure 3B:
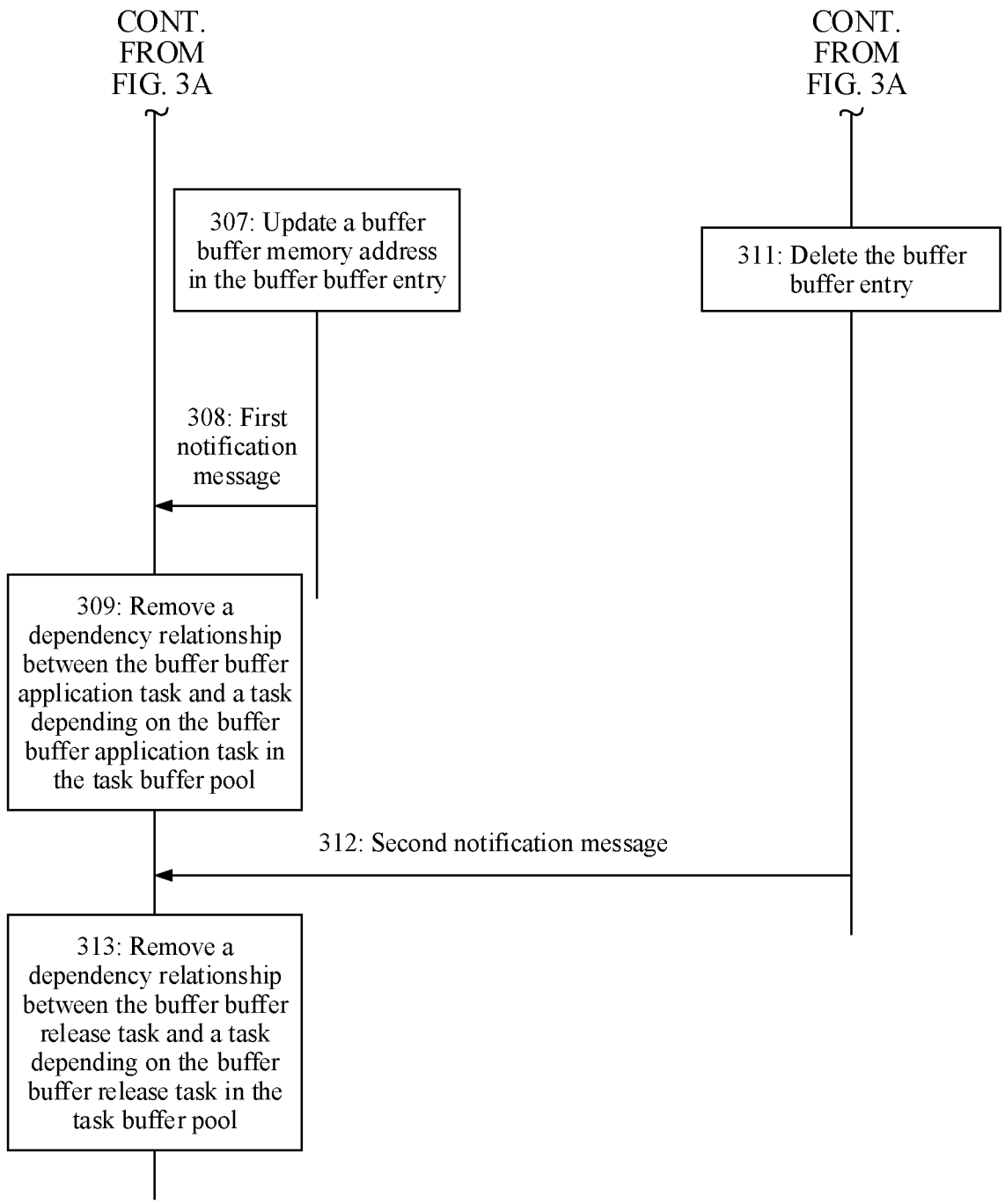

Referring to FIG. 3A and FIG. 3B, in an embodiment of FIG. 3A and FIG. 3B, the computer device obtains the corresponding buffer entry from the buffer resource pool in the computer device based on the memory ID through the buffer manager, and then the buffer manager executes the target task based on a task type of the target task and the buffer entry. Another embodiment of the data processing method in the embodiments of this application includes the following steps.

301: The computer device obtains a target task from the task buffer pool in the computer device through the task scheduler.

In a running process, the application routine module in the computer device calls an application programming interface of the task generation apparatus in the heterogeneous computing runtime module in the computer device, and then inputs a corresponding application programming interface parameter into the task generation apparatus. Then, the task generation apparatus generates a task based on the application programming interface parameter, and then places the generated task in the task buffer pool in the computer device. In this embodiment, the target task is a buffer application task or a buffer release task. After a preceding task of the target task is executed and before a successive task of the target task is executed, the task scheduler obtains the target task from the task buffer pool. There is logically a sequential dependency relationship between the preceding task and the successive task. The target task carries a memory ID of a buffer corresponding to the target task.

For example, when the target task is the buffer application task, an earlier process in which the task generation apparatus in the computer device creates the buffer application task is as follows. The computer device calls, through the application routine module, the application programming interface of the task generation apparatus to initiate the buffer application task, and inputs a related parameter of the corresponding buffer application task into the application programming interface. Then, the task generation apparatus may apply for a buffer entry and the memory ID corresponding to the buffer in the buffer resource pool in the computer device. The task generation apparatus fills in the buffer entry based on the related parameter, sets a memory address in the buffer entry to a null address, applies for the buffer application task based on the buffer entry, where the buffer application task carries the memory ID, and places the buffer application task in the task buffer pool in the computer device. Then, the application programming interface of the task generation apparatus returns the memory ID to the application routine module. When the target task is the buffer release task, a process in which the task generation apparatus creates the buffer release task is as follows. The task generation apparatus creates the buffer release task based on a related parameter input by the application routine module, where the buffer release task carries a memory ID of the buffer, and places the buffer release task into the task buffer pool.

In this embodiment, the target task carries the memory ID of the buffer corresponding to the target task. Referring to Table 1, Table 1 is a buffer resource pool in a dimension of buffers. A buffer 1, a buffer 2, and a buffer 3 represent three buffer entries, and each entry includes information such as a memory ID, a memory size, a memory location, and a memory address. For example, the target task is a buffer application task, a memory ID of the target task is 101, a buffer entry corresponding to the target task is an entry corresponding to the memory ID 101, a memory size of a buffer corresponding to the target task is 500, a memory location corresponding to the target task is a local memory 1, and a memory address corresponding to the target task is 0x1001.

TABLE 1

|  | Memory ID | Memory size | Memory location | Memory address |
| --- | --- | --- | --- | --- |
| Buffer 1 | 101 | 500 | Local memory 1 | 0x1001 |
| Buffer 2 | 102 | 1000 | Global memory | 0x2104a |
| Buffer 3 | 201 | 30 | Local memory 3 | Null |
| ... | | | | |

302: The computer device determines a task type of the target task through the task scheduler.

After the task scheduler obtains the target task, the computer device may determine the task type of the target task based on a field in the target task through the task scheduler. For example, when a first task is the buffer application task, the target task carries a corresponding field to indicate the buffer application task.

303: If the task type of the target task is the buffer application task or the buffer release task, the computer device sends the target task to the buffer manager in the computer device through the task scheduler.

After the task scheduler determines that the task type of the target task is the buffer application task or the buffer release task, the task scheduler may send the target task to the buffer manager in the computer device, where the target task carries the memory ID of the buffer corresponding to the target task.

304: The computer device obtains, through the buffer manager from the buffer resource pool in the computer device based on the memory ID that is of the buffer and that is carried in the target task, the buffer entry corresponding to the memory ID.

The computer device may obtain the corresponding buffer entry from the buffer resource pool in the computer device through the buffer manager based on the memory ID carried in the target task. For example, in Table 1, assuming that the memory ID is 101, the buffer manager may obtain the buffer entry corresponding to the memory ID. Table 2 shows the buffer entry corresponding to the memory ID.

TABLE 2

| Memory ID | Memory size | Memory location | Memory address |
|---|---|---|---|
| 101 | 500 | Local memory 1 | 0x10001 |

For example, if the memory ID is 201, the computer device may obtain, through the buffer manager, a buffer entry corresponding to the memory ID. Table 3 shows the buffer entry corresponding to the memory ID 201.

TABLE 3

| Memory ID | Memory size | Memory location | Memory address |
|---|---|---|---|
| 201 | 30 | Local memory 2 | Null |

305: The computer device determines the task type of the target task through the buffer manager, and if the task type of the target task is the buffer application task, performs step 306, or if the task type of the target task is the buffer release task, performs step 310.

The buffer manager in the computer device may determine the task type of the target task based on the target task. When the task type of the target task is the buffer application task, step 306 is performed. When the task type of the target task is the buffer release task, step 310 is performed.

306: The computer device determines, through the buffer manager, that a free memory size in a buffer memory location is greater than the buffer memory size.

When the target task is the buffer application task, the buffer manager in the computer device queries the buffer entry obtained in step 304 for the buffer memory location. Then, the buffer manager may determine whether the free memory size in the memory location is greater than the buffer memory size in the buffer entry. If the free memory size in the memory location is greater than the buffer memory size in the buffer entry, the buffer manager may determine that there is sufficient free memory in the buffer memory location. For example, the buffer entry obtained by the buffer manager in step 304 is the entry shown in Table 3, and it can be learned from Table 3 that, a memory location of a buffer applied for by the buffer application task is a local memory 2, and a memory size is 30. In this case, the buffer manager determines whether a free memory size in the local memory 2 is greater than 30. If the free memory size is greater than 30, the buffer manager determines that the local memory 2 has sufficient memory.

It should be noted that, when the buffer manager determines that a free memory in the buffer memory location is insufficient, the buffer manager may wait until there is sufficient free memory in the memory location, and then determine to allocate a memory for the buffer entry. Alternatively, the buffer manager may use a global memory to replace the local memory, and then allocate the global memory to the buffer entry. This is not limited herein. When memory insufficiency also occurs in the global memory, the buffer manager may wait until there is sufficient free memory in the global memory, and then allocate a memory to the buffer. This is not limited herein.

In this embodiment, when the computer device performs asynchronous data exchange buffer management through the heterogeneous computing runtime module, the heterogeneous computing runtime module can learn of a dependency relationship between a buffer and a heterogeneous computing task. Therefore, the computer device may perform buffer affinity scheduling on the heterogeneous computing task through the task scheduler. The task scheduler can support buffer allocation and management of a local device memory. This improves access performance during execution of the heterogeneous computing task, and meets requirements of different application scenarios. Because access performance of the global memory is poorer than access performance of the local memory, when data exchange is performed in the heterogeneous computing task that requires comparatively high access performance, the heterogeneous computing task may be executed by applying for the local device memory. For example, if the computer device determines, through the application routine module, that data is data that is most frequently copied or most frequently used during execution of the heterogeneous computing task, the application routine module may apply for a buffer of the local memory, and subsequently copy the data to the local memory corresponding to the buffer. Therefore, when the heterogeneous computing task is executed, the data is read or written more efficiently. This fully utilizes comparatively high access performance of the local memory, and meets requirements of different application scenarios.

307: The computer device updates the buffer memory address in the buffer entry through the buffer manager.

After the buffer manager determines the free memory in the buffer memory location, the buffer manager updates the memory address in the buffer entry. For example, the buffer entry that is obtained by the buffer manager from the buffer resource pool based on the memory ID is the entry shown in Table 3, and after the buffer manager determines the free memory, the buffer manager fills in a memory address corresponding to the free memory into a space corresponding to the memory address in Table 3. In other words, the null address corresponding to the memory address in Table 3 is updated to the memory address corresponding to the free memory.

308: The computer device sends a first notification message to the task scheduler in the computer device through the buffer manager.

After the buffer manager updates the buffer memory address in the buffer entry, the buffer manager sends the first notification message to the task scheduler, where the first notification message is used to indicate that the buffer manager has executed the target task.

309: The computer device removes, through the task scheduler, a dependency relationship between the buffer application task and a task depending on the buffer application task in the task buffer pool in the computer device.

After the task scheduler receives the first notification message, the task scheduler removes the dependency relationship between the buffer application task and the task depending on the buffer application task in the task buffer pool such that the task scheduler subsequently schedules the task whose dependency relationship between the task and the buffer application task is removed.

310: The computer device releases, through the buffer manager, a device memory corresponding to the buffer memory address in the buffer entry.

When the target task is the buffer release task, the buffer manager releases the device memory corresponding to the buffer memory address in the buffer entry obtained in step 304. For example, the buffer memory address in Table 2 is 0x10001, and the buffer manager may release a device memory corresponding to 0x10001.

311: The computer device deletes the buffer entry from the buffer resource pool in the computer device through the buffer manager.

After releasing the device memory corresponding to the buffer memory address, the buffer manager deletes the buffer entry from the buffer resource pool. For example, if the buffer manager determines that the buffer entry corresponding to the memory ID is the buffer entry shown in Table 2, after the buffer manager releases the device memory corresponding to the buffer memory address, the buffer manager may delete Table 2 from the buffer resource pool.

312: The computer device sends a second notification message to the task scheduler in the computer device through the buffer manager.

After the buffer manager deletes the buffer entry, the buffer manager may send the second notification message to the task scheduler, where the second notification message is used to indicate that the buffer manager has executed the buffer release task.

313: The computer device removes, through the task scheduler, a dependency relationship between the buffer release task and a task depending on the buffer release task in the task buffer pool in the computer device.

After the computer device receives the second notification message through the task scheduler, the task scheduler may remove the dependency relationship between the buffer release task and the task depending on the buffer release task in the task buffer pool.

In this embodiment of this application, the computer device receives, through the buffer manager, the target task sent by the task scheduler in the computer device. The target task is a successive task of the first task and is a preceding task of a second task. The first task and the second task are to-be-executed tasks between which there is a sequential dependency relationship. When the target task is the buffer application task, execution of the second task uses a buffer corresponding to the buffer application task. When the target task is the buffer release task, execution of the first task uses a buffer corresponding to the buffer release task. After the preceding task of the target task is executed and before the successive task of the target task is executed, the computer device may obtain, from the buffer resource pool in the computer device based on the target task, the buffer entry corresponding to the task through the buffer manager, where the buffer resource pool in the computer device stores a buffer entry of each buffer, and then the computer device may execute the target task based on the buffer entry through the buffer manager, to apply for or release the buffer corresponding to the target task. Therefore, before the computer device applies for the buffer or releases the buffer, the computer device may determine to execute the target task only after the preceding task of the target task is executed and before the successive task of the target task is executed. Therefore, the computer device may apply for the buffer after the preceding task of the target task is executed and before the successive task of the target task is executed, and the computer device may release the buffer immediately after the preceding task of the target task is executed, where a moment at which the buffer is applied for is postponed and a moment at which the buffer is released is advanced in comparison with the some other solution. This improves utilization of a device memory corresponding to the buffer.

In an embodiment of this application, the computer device may obtain, through the buffer manager, a corresponding buffer entry from the buffer resource pool in the computer device based on a dependent task group ID carried in a target task that is sent by the task scheduler in the computer device, and execute the target task based on the buffer entry, to apply for or release a buffer corresponding to the target task. The target task is a buffer application task or a buffer release task, and the target task is a task in a dependent task group. The following provides detailed descriptions with reference to FIG. 4A and FIG. 4B.

Figure 4A:
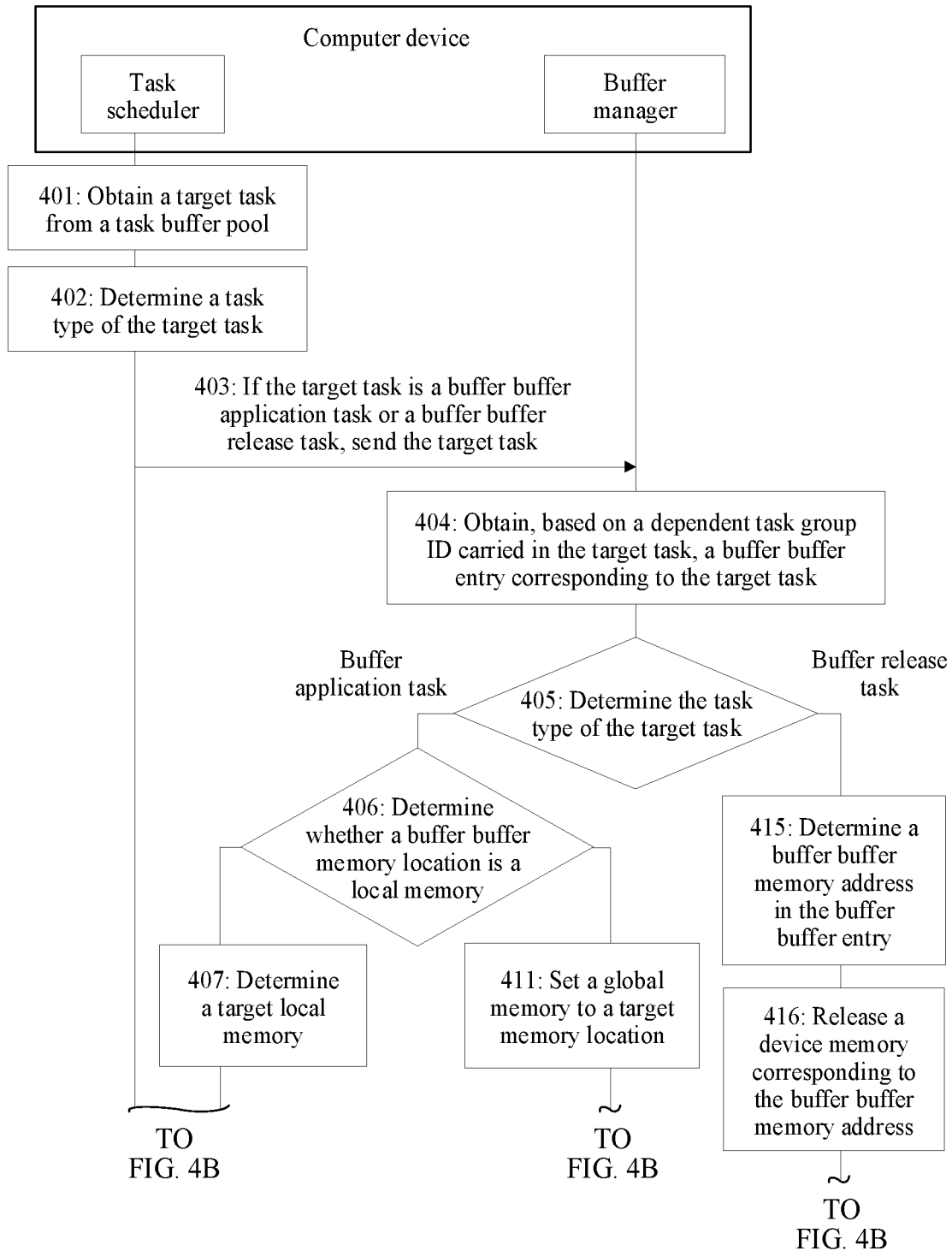
FIG. 4A and FIG. 4B are a schematic diagram of another embodiment of a data processing method according to embodiments of this application.
Figure 4B:
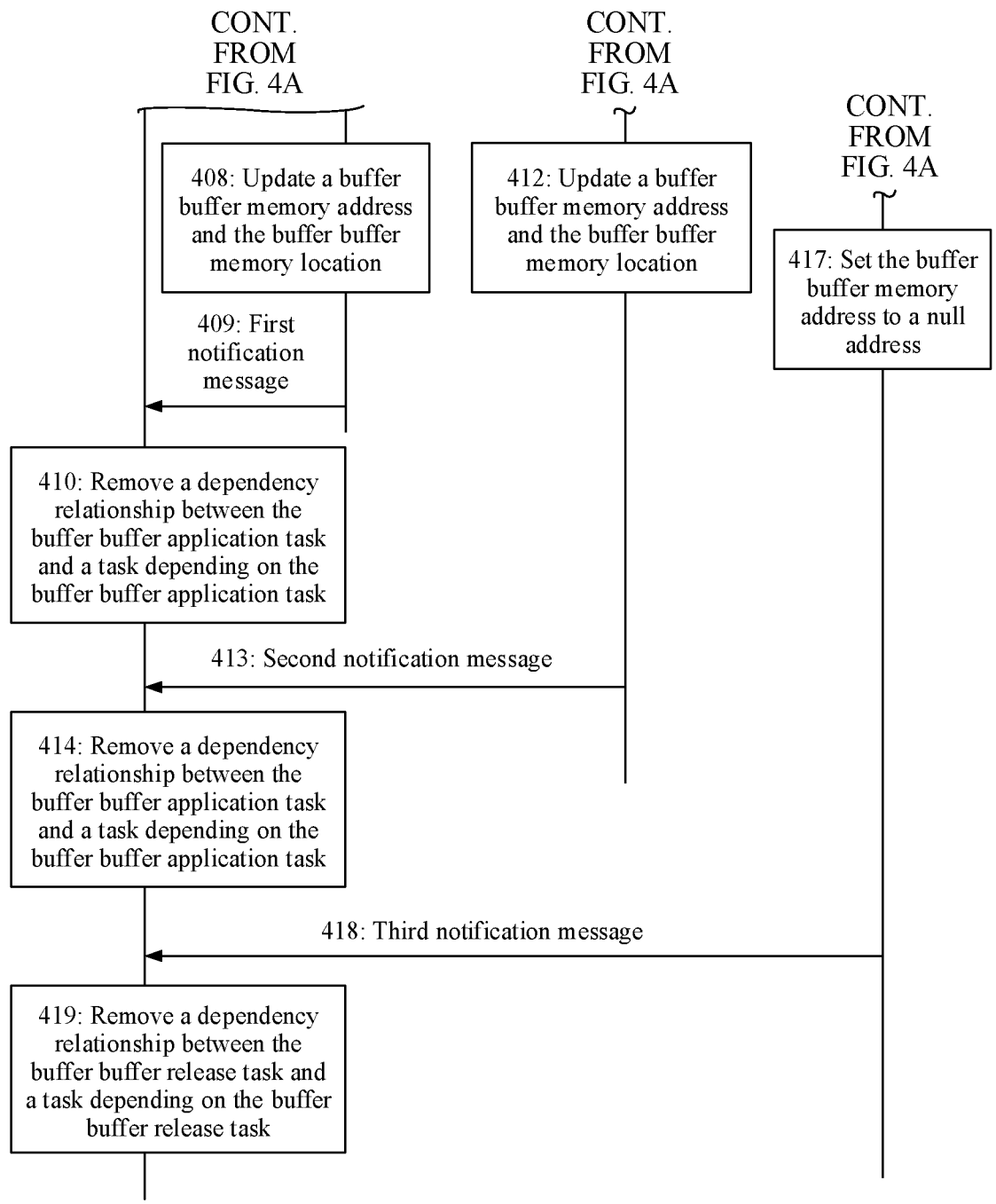

Referring to FIG. 4A and FIG. 4B, in an embodiment of FIG. 4A and FIG. 4B, the computer device obtains the corresponding buffer entry from the buffer resource pool based on the dependent task group ID through the buffer manager, and then the buffer manager executes the target task based on the buffer entry to apply for or release the buffer corresponding to the target task. Another embodiment of the data processing method in the embodiments of this application includes the following steps.

401: The computer device obtains a target task from the task buffer pool in the computer device through the task scheduler.

402: The computer device determines a task type of the target task through the task scheduler.

403: If the task type of the target task is a buffer application task or a buffer release task, the computer device sends the target task to the buffer manager in the computer device through the task scheduler.

Step 401 to step 403 are similar to step 301 to step 303 in FIG. 3A. Details are not described herein again.

It should be noted that, in this embodiment, a specific process in which the computer device creates the buffer application task through the task generation apparatus is as follows. The task generation apparatus fills in, based on an application programming interface parameter that is input when the application routine module calls the application programming interface of the task generation apparatus, a buffer entry corresponding to a dependent task group ID, and sets a memory address in the buffer entry to a null address. Then, the task generation apparatus creates the buffer application task based on the buffer entry, where the buffer application task carries a dependent task group ID, and then places the task in the task buffer pool in the computer device. In addition, a specific process in which the task generation apparatus creates the buffer release task is as follows. The task generation apparatus creates the buffer release task based on an application programming interface parameter, where the buffer release task carries a dependent task group ID, and then places the task into the task buffer pool in the computer device.

404: The computer device obtains, through the buffer manager based on the dependent task group ID carried in the target task, the buffer entry corresponding to the target task.

After the buffer manager receives the target task sent by the task scheduler, the buffer manager may obtain, from the buffer resource pool in the computer device based on the dependent task group ID carried in the target task, the buffer entry corresponding to the target task. The buffer resource pool in the computer device stores related information of each buffer. The buffer entry is an entry including related information of a buffer corresponding to the target task. The buffer entry may include a memory size, a memory address, a memory location, and the like that are of the buffer corresponding to the target task. This is not limited in this application. In this implementation, the buffer resource pool is a data table in a dimension of dependent task groups, for example, a data table shown in Table 4. In Table 4, a buffer entry corresponding to a dependent task group 1 shows that a memory size of a buffer corresponding to the dependent task group 1 is 500, and a memory location of the buffer corresponding to the dependent task group 1 is a local memory 1, and a memory address of the buffer corresponding to the dependent task group 1 is 0x10001.

TABLE 4

| | Memory size | Memory location | Memory address |
|---|---|---|---|
| Dependent task group 1 | 500 | Local memory 1 | 0x10001 |
| Dependent task group 2 | 1000 | Global memory | 0x2104a |
| Dependent task group 3 | 30 | Local memory 2 | Null |
| ... | | | |

For example, an entry corresponding to the dependent task group ID carried in the target task is a buffer entry corresponding to the dependent task group 3 in Table 4. In this case, the computer device may obtain, from the buffer resource pool in the computer device through the buffer manager, the buffer entry corresponding to the dependent task group 3. Table 5 shows the buffer entry obtained by the buffer manager based on the dependent task group ID carried in the target task.

TABLE 5

| Memory size | Memory location | Memory address |
|---|---|---|
| 30 | Local memory 2 | Null |

405: The computer device determines the task type of the target task through the buffer manager, and if the task type of the target task is the buffer application task, performs step 406, or if the task type of the target task is the buffer release task, performs step 415.

After obtaining the target task, the buffer manager may determine the task type of the target task. If the task type of the target task is the buffer application task, step 406 is performed. If the task type of the target task is the buffer release task, step 415 is performed.

It should be noted that, that the buffer manager determines the task type of the target task may be as follows. The buffer manager determines the task type of the target task based on a field in the target task, or the buffer manager determines the task type of the target task in another manner. This is not limited herein.

406: The computer device determines, through the buffer manager, whether the buffer memory location is a local memory, and if yes, performs step 407, or if no, performs step 411.

When the buffer manager determines that the task type of the target task is the buffer application task, the buffer manager may determine whether the memory location of the buffer corresponding to the target task is the local memory. If the memory location of the buffer corresponding to the target task is the local memory, step 407 is performed. If the memory location of the buffer corresponding to the target task is not the local memory, step 411 is performed. For example, the buffer entry corresponding to the target task is the buffer entry shown in Table 5, and a memory location of a buffer in Table 5 is a local memory 2. Therefore, the buffer manager may determine that the memory location of the buffer is the local memory.

It should be noted that, in the buffer resource pool in the dimension of dependent task groups, when there is a plurality of buffers on which tasks in a dependent task group depends, related information of the buffers in the buffer entry changes. For example, the dependent task group includes a task A, a task B, a task C, and a task D. There is a dependency relationship between the task A and the task B, there is a dependency relationship between the task C and the task D, the task A and the task B share a buffer D1, and the task C and the task D share a buffer D2. When the task A and the task B are executed, a buffer entry corresponding to the dependent task group includes related information of the buffer D1. After the task A and the task B are executed, the buffer manager releases the buffer 131, that is, deletes the related information of the buffer D1 from the buffer entry. Then, the buffer manager correspondingly applies for the buffer D2 based on task information sent by the task scheduler. In this case, the buffer entry includes related information of the buffer D2, and a corresponding module may execute the task C and the task D.

In this embodiment, when the computer device performs asynchronous data exchange buffer management through the heterogeneous computing runtime module, the heterogeneous computing runtime module can learn of a dependency relationship between a buffer and a heterogeneous computing task. Therefore, the computer device may perform buffer affinity scheduling on the heterogeneous computing task through the task scheduler. The task scheduler can support buffer allocation and management of a local device memory. This improves access performance during execution of the heterogeneous computing task, and meets requirements of different application scenarios. Because access performance of a global memory is poorer than access performance of the local memory, when data exchange is performed in the heterogeneous computing task that requires comparatively high access performance, the heterogeneous computing task may be executed by applying for the local device memory. For example, the computer device determines, through the application routine module, that data is data that is most frequently copied or most frequently used during execution of the heterogeneous computing task. In this case, the application routine module may apply for a buffer of the local memory, and subsequently copy the data to the local memory corresponding to the buffer. Therefore, when the heterogeneous computing task is executed, the data is read or written more efficiently. This fully utilizes comparatively high access performance of the local memory. According to the data processing method in this application, it is supported that a corresponding device memory of any level may be applied for a buffer used for data exchange. Therefore, this can meet diversified device memory scenarios and meet requirements of different application scenarios.

407: The computer device determines a target local memory through the buffer manager.

After the buffer manager determines that the memory location of the buffer corresponding to the target task is the local memory, the buffer manager may determine the target local memory based on a load status of the computing unit and a free status of the local memory.

It should be noted that, when the buffer manager determines that there is insufficient memory in the local memory, the buffer manager may wait until there is sufficient memory in the local memory, and then apply for a corresponding memory for the buffer. Alternatively, the buffer manager may use a global memory as a target memory, and then apply for a device memory corresponding to the global memory for the buffer. This is not limited in this application.

408: The computer device updates the buffer memory address and the buffer memory location through the buffer manager.

After the buffer manager determines the target local memory, the buffer manager may update the buffer memory address and the buffer memory location in the buffer entry based on the target local memory. For example, in step 404, if the buffer manager determines that the buffer entry corresponding to the target task is the buffer entry shown in Table 5, the buffer manager updates the memory address and the memory location in Table 5 based on the determined target local memory.

409: The computer device sends a first notification message to the task scheduler through the buffer manager.

410: The computer device removes, through the task scheduler, a dependency relationship between the buffer application task and a task depending on the buffer application task.

Step 409 and step 410 are similar to step 308 and step 309 in FIG. 3B. Details are not described herein again.

411: The computer device sets the global memory to a target memory location through the buffer manager.

After the buffer manager determines that the memory location of the buffer is not the local memory, the buffer manager may set the global memory as the target memory location of the buffer corresponding to the target task. For example, the buffer manager obtains a corresponding buffer entry from the buffer resource pool based on the task information, and determines, based on the buffer entry, that the memory location of the buffer is the global memory.

412: The computer device updates the buffer memory address and the buffer memory location through the buffer manager.

If the buffer manager determines that the buffer corresponding to the target task is located in the global memory, the buffer manager may update the buffer memory address and the buffer memory location in the buffer entry based on the global memory. For example, if the buffer manager determines a corresponding global memory, the buffer manager may fill in the buffer entry of the buffer with a memory address corresponding to the global memory and a memory location corresponding to the global memory.

413: The computer device sends a second notification message to the task scheduler through the buffer manager.

414: The computer device removes, through the task scheduler, a dependency relationship between the buffer application task and a task depending on the buffer application task.

Step 413 and step 414 are similar to step 308 and step 309 in FIG. 3B. Details are not described herein again.

415: The computer device determines the buffer memory address in the buffer entry through the buffer manager.

When the buffer manager determines that the task type of the target task is the buffer release task, the buffer manager may determine the buffer memory address in the buffer entry. For example, the buffer entry corresponding to the dependent task group ID carried in the target task is the buffer entry corresponding to the dependent task group 1 in Table 1, that is, the buffer entry shown in Table 6, and the memory address is 0x10001.

TABLE 6

| Memory size | Memory location | Memory address |
| --- | --- | --- |
| 500 | Local memory 1 | 0x10001 |

416: The computer device releases, through the buffer manager, a device memory corresponding to the buffer memory address.

After the buffer manager determines the buffer memory address, the buffer manager may release the device memory corresponding to the buffer memory address. For example, in step 415, the buffer manager determines that the buffer memory address is 0x10001, and the buffer manager may release a device memory corresponding to 0x10001.

417: The computer device sets the buffer memory address to a null address through the buffer manager.

After releasing the device memory corresponding to the buffer memory address, the buffer manager may set the buffer memory address in the buffer entry to the null address. For example, in Table 6, 0x10001 is set to a null address, as shown in Table 7.

TABLE 7

| Memory size | Memory location | Memory address |
| --- | --- | --- |
| 500 | Local memory 1 | Null |

It should be noted that, after all the tasks in the dependent task group are executed, the buffer manager may delete the buffer entry corresponding to the dependent task group from the buffer resource pool when releasing the corresponding buffer.

418: The computer device sends a third notification message to the task scheduler through the buffer manager.

419: The computer device removes, through the task scheduler, a dependency relationship between the buffer release task and a task depending on the buffer release task.

Step 418 and step 419 are similar to step 312 and step 313 in FIG. 3B. Details are not described herein again.

In this embodiment of this application, the computer device receives, through the buffer manager, the target task sent by the task scheduler in the computer device. The target task is a successive task of a first task and is a preceding task of a second task. The first task and the second task are to-be-executed tasks between which there is a sequential dependency relationship. When the target task is the buffer application task, execution of the second task uses a buffer corresponding to the buffer application task. When the target task is the buffer release task, execution of the first task uses a buffer corresponding to the buffer release task. After a preceding task of the target task is executed and before a successive task of the target task is executed, the computer device may obtain, from the buffer resource pool in the computer device based on the target task, the buffer entry corresponding to the task through the buffer manager, where the buffer resource pool in the computer device stores a buffer entry of each buffer, and then the computer device may execute the target task based on the buffer entry through the buffer manager, to apply for or release the buffer corresponding to the target task. Therefore, before the computer device applies for the buffer or releases the buffer, the computer device may determine to execute the target task only after the preceding task of the target task is executed and before the successive task of the target task is executed. Therefore, the computer device may apply for the buffer after the preceding task of the target task is executed and before the successive task of the target task is executed, and the computer device may release the buffer immediately after the preceding task of the target task is executed, where a moment at which the buffer is applied for is postponed and a moment at which the buffer is released is advanced in comparison with the other approaches solution. This improves utilization of a device memory corresponding to the buffer.

In an embodiment of this application, the computer device may call, through the task scheduler, a corresponding module in the computer device based on a task type of a target task and a memory ID carried in the target task, to execute the target task. The following provides detailed descriptions with reference to FIG. 5A to FIG. 5C.

Figure 5A:
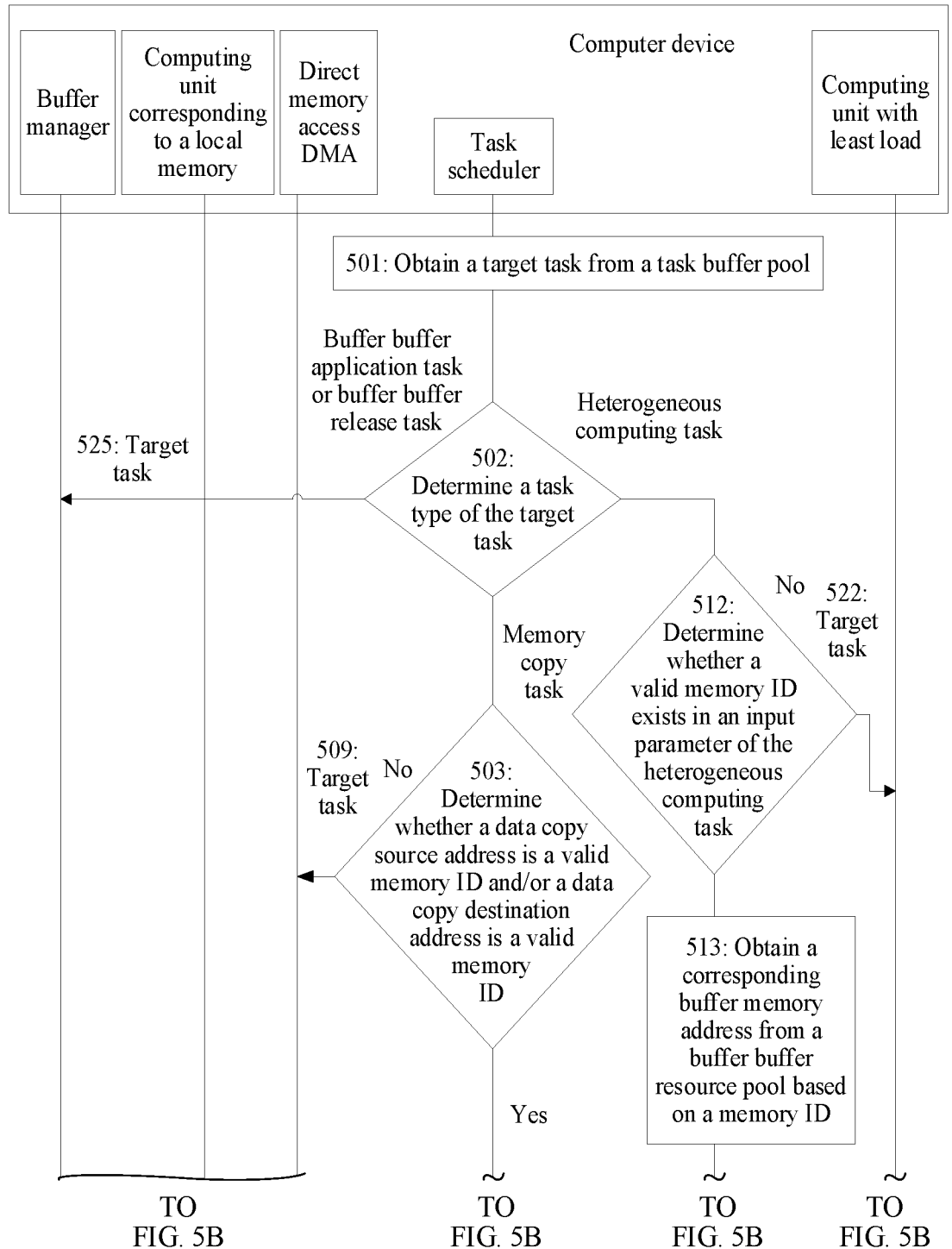
FIG. 5A, FIG. 5B, and FIG. 5C are a schematic diagram of another embodiment of a data processing method according to embodiments of this application.
Figure 5B:
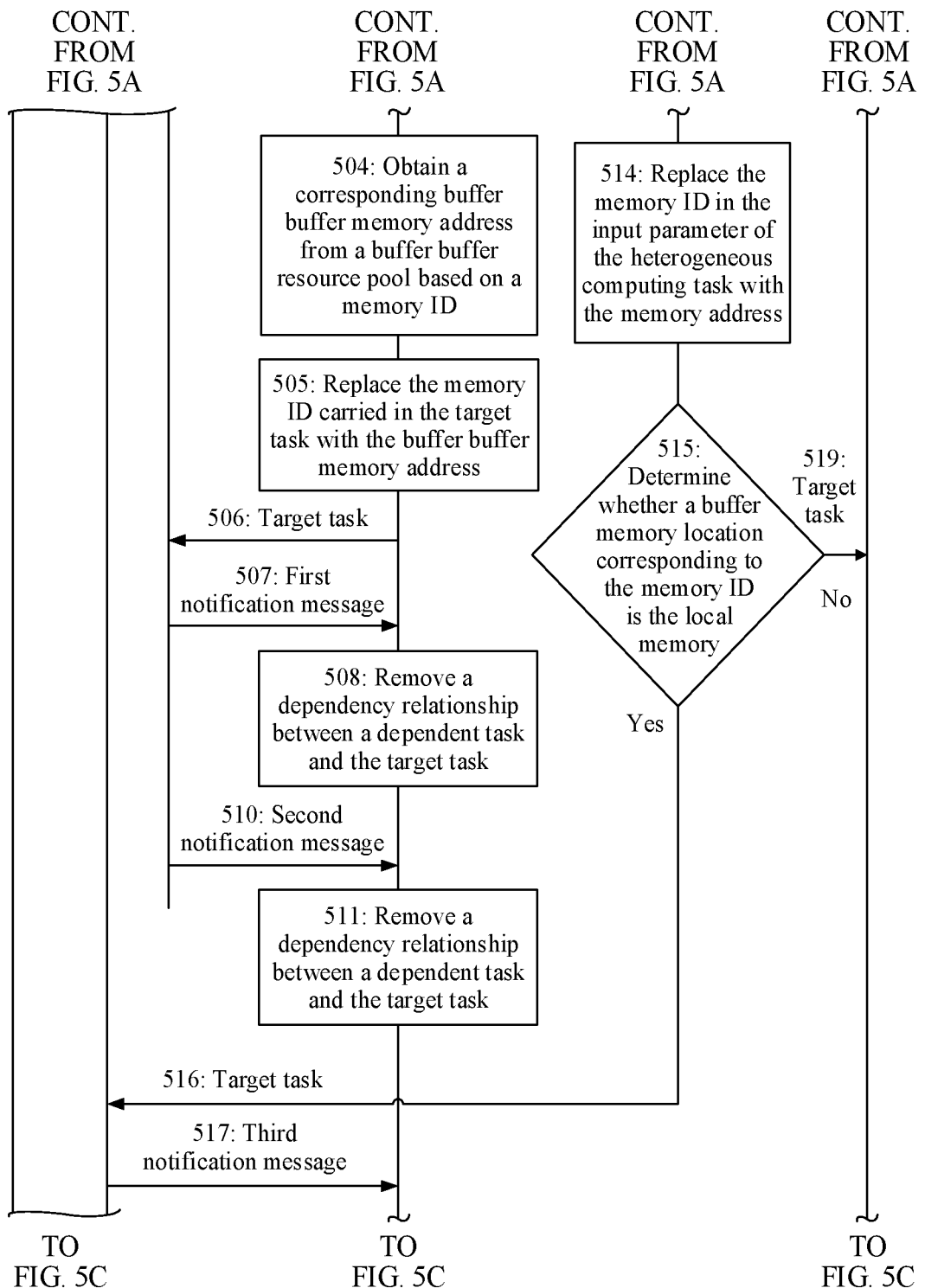
Figure 5C:
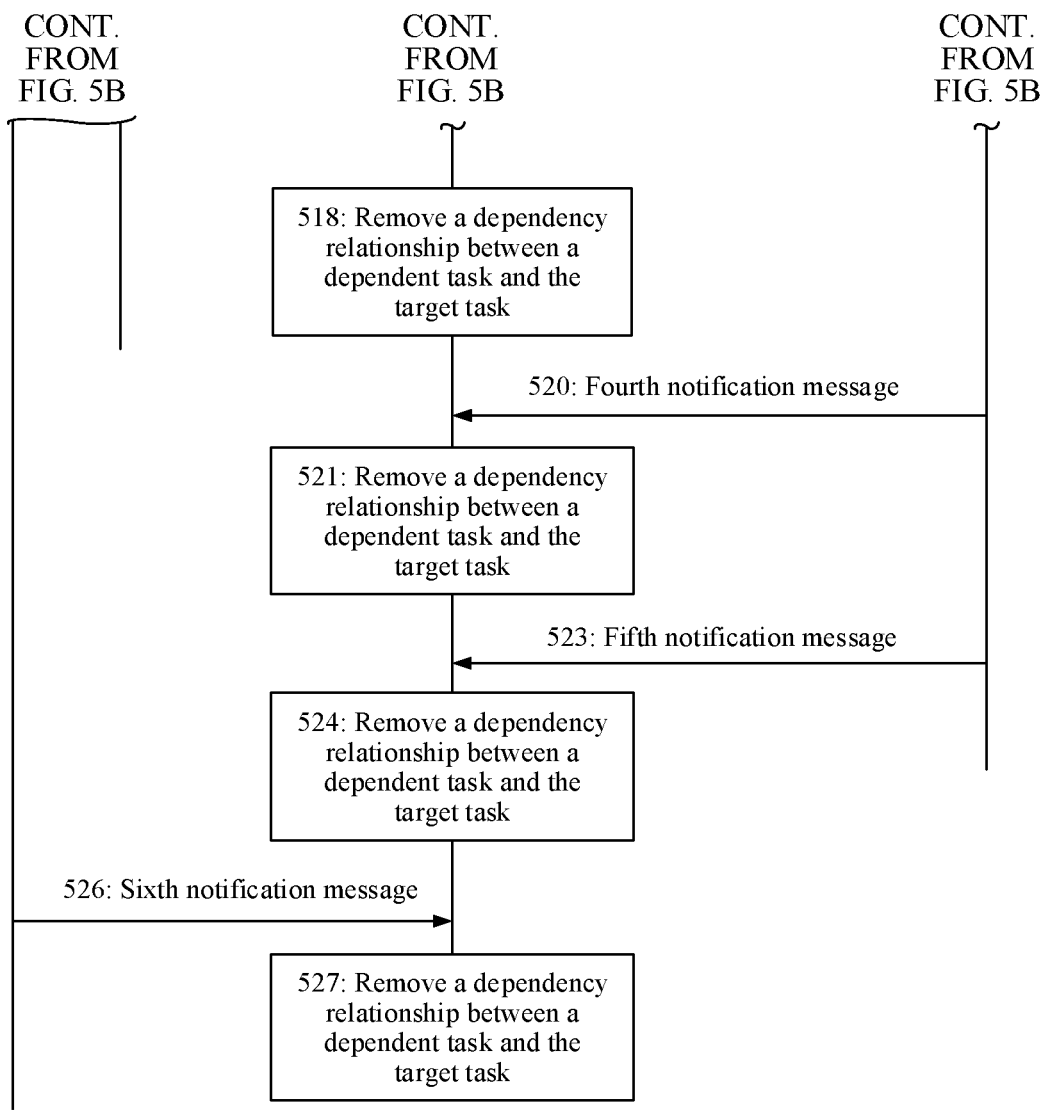

Referring to FIG. 5A to FIG. 5C, in an embodiment of FIG. 5A to FIG. 5C, the computer device calls, through the task scheduler based on the task type of the target task and the memory ID carried in the target task, the corresponding module in the computer device to execute the target task. Another embodiment of the data processing method in the embodiments of this application includes the following steps.

501: The computer device obtains a target task from the task buffer pool in the computer device through the task scheduler.

In a process of running code by the application routine module in the computer device, the application routine module calls the application programming interface of the task generation apparatus in the heterogeneous computing runtime module in the computer device, and then inputs a corresponding application programming interface parameter into the task generation apparatus. Then, the task generation apparatus generates a task based on the application programming interface parameter, and then places the generated task in the task buffer pool in the computer device. The computer device may obtain the target task from the task buffer pool in the computer device through the task scheduler. The target task is a task whose preceding task is executed and whose successive task is to be executed. There is logically a sequential dependency relationship between the preceding task and the successive task. The target task carries a memory ID of a buffer corresponding to the target task.

502: The computer device determines a task type of the target task through the task scheduler, and if the task type of the target task is a memory copy task, performs step 503, or if the task type of the target task is a heterogeneous computing task, performs step 512, or if the task type of the target task is a buffer application task or a buffer release task, performs step 524.

The computer device may determine the task type of the target task through the task scheduler, and if the task type of the target task is the memory copy task, performs step 503, or if the task type of the target task is the heterogeneous computing task, performs step 512, or if the task type of the target task is the buffer application task or the buffer release task, performs step 524. Further, the task scheduler may determine the task type of the target task based on a field in the target task.

503: The computer device determines, through the task scheduler, whether a data copy source address is a valid memory ID and/or whether a data copy destination address is a valid memory ID, and if the source address is the valid memory ID and/or the destination address is the valid memory ID, performs step 504, or if neither the source address nor the destination address is the valid memory ID, performs step 509.

The computer device may determine, through the task scheduler, whether the data copy source address corresponding to the memory copy task is the valid memory ID and/or whether the data copy destination address is the valid memory ID. If the source address is the valid memory ID and/or the destination address is the valid memory ID, the computer device performs step 504, or if neither the source address nor the destination address is the valid memory ID, the computer device performs step 509. For example, the memory copy data source address is 101. If there is a buffer corresponding to the memory ID 101 in the buffer resource pool, it indicates that the memory ID 101 is a valid memory ID. In this case, data in a device memory corresponding to a memory address 0x10001 is copied to the destination address. For example, if the memory copy data destination address is 101, data corresponding to the source address is copied to the device memory corresponding to 0x10001.

It should be noted that the valid memory ID is a memory ID of a buffer that has been applied for by the computer device through the buffer manager. If the data copy source address or the data copy destination address of the memory copy task includes the memory ID of the applied buffer, it may be determined that the memory ID is a valid memory ID.

504: The computer device obtains a corresponding buffer memory address from the buffer resource pool in the computer device based on the memory ID through the task scheduler.

After the task scheduler determines that the task type of the target task is the memory copy task, the task scheduler may obtain a corresponding buffer memory address from the buffer resource pool based on the memory ID carried in the target task. For example, if the memory ID is 101, as shown in Table 1, a buffer entry corresponding to the memory ID is the buffer entry shown in Table 2, and the buffer memory address is 0x10001.

505: The computer device replaces, through the task scheduler, the memory ID carried in the target task with the buffer memory address.

The task scheduler may replace the memory ID carried in the target task with the buffer memory address. For example, if the source address of the data copy task is 101, the task scheduler may replace the source address with 0x10001.

506: The computer device sends the target task to the DMA in the computer device through the task scheduler and through a data migration transmitter in the computer device.

The computer device may send the target task to the DMA through the task scheduler and through the data migration transmitter, where the target task carries the buffer memory address. For example, after the task scheduler replaces the memory ID of the target task to 0x10001, the task scheduler may send the target task to the DMA. After receiving the target task, the DMA executes the target task based on the memory address carried in the target task, to copy the target data to the target address.

507: The computer device sends a first notification message to the task scheduler in the computer device through the DMA.

After executing the target task, the DMA may send the first notification message to the task scheduler, where the first notification message is used to indicate that the DMA has executed the target task.

508: The computer device removes, through the task scheduler, a dependency relationship between a dependent task and the target task.

After the task scheduler receives the first notification message, the task scheduler may remove the dependency relationship between the target task and the task depending on the target task in the task buffer pool.

509: The computer device sends the target task to the DMA in the computer device through the task scheduler.

When the task scheduler determines that the data copy source address and the data copy destination address are specific memory addresses, the task scheduler may send the target task to the DMA through the data migration transmitter, and the DMA directly executes the target task. For example, if the data copy source address and the data copy destination address in the memory copy task are not memory IDs corresponding to the applied buffer in the buffer resource pool, the task scheduler directly schedules the DMA to copy the data.

510: The computer device sends a second notification message to the task scheduler in the computer device through the DMA.

511: The computer device removes, through the task scheduler, a dependency relationship between a dependent task and the memory copy task.

Step 510 and step 511 are similar to step 507 and step 508. Details are not described herein again.

512: The computer device determines, through the task scheduler, whether a valid memory ID exists in an input parameter of the heterogeneous computing task, and if yes, performs step 513, or if no, performs step 522.

When the task scheduler determines that the task type of the target task is the heterogeneous computing task, the task scheduler may determine whether there is the valid memory ID in the input parameter of the heterogeneous computing task. If the valid memory ID exists in the input parameter of the heterogeneous computing task, the task scheduler performs step 513, or if no valid memory ID exists in the input parameter of the heterogeneous computing task, the task scheduler performs step 522. For example, if the memory ID of the buffer applied for by the buffer manager is 101, and 101 exists in the input parameter of the heterogeneous computing task, the task scheduler may determine that the valid memory ID exists in the input parameter of the heterogeneous computing task.

513: The computer device obtains a corresponding buffer memory address from the buffer resource pool based on the memory ID through the task scheduler.

The task scheduler may obtain a buffer entry corresponding to the memory ID from the buffer resource pool based on the memory ID, and then the task scheduler may determine the buffer memory address from the buffer entry. For example, if the memory ID is 101, the buffer entry corresponding to the memory ID is the buffer entry shown in Table 2, and it can be learned that the buffer memory address is 0x10001.

514: The computer device replaces the memory ID in the input parameter of the heterogeneous computing task with the buffer memory address through the task scheduler.

After the task scheduler determines that the valid memory ID exists in the input parameter of the heterogeneous computing task, the task scheduler may replace the memory ID in the input parameter of the heterogeneous computing task with the buffer memory address. For example, if the task scheduler determines that the memory ID is 101, and the corresponding buffer memory address is 0x10001, the task scheduler may replace the memory ID in the input parameter of the heterogeneous computing task with the buffer memory address.

515: The computer device determines, through the task scheduler, whether a buffer memory location corresponding to the memory ID is a local memory, and if yes, performs step 516, or if no, performs step 519.

The task scheduler may determine whether the buffer memory location corresponding to the memory ID is the local memory, and if the buffer memory location corresponding to the memory ID is the local memory, perform step 516, or if the buffer memory location corresponding to the memory ID is not the local memory, perform step 519. For example, if the memory ID is 101, it may be determined from Table 2 that the buffer memory location is the local memory 1, or if the memory ID is 102, it may be determined from Table 1 that the buffer memory location is a global memory.

516: The computer device sends, through the task scheduler, the target task to a computing unit corresponding to the buffer local memory in the computer device.

After the task scheduler determines that the buffer memory location corresponding to the memory ID is the local memory, the task scheduler may send the target task to the computing unit corresponding to the buffer local memory. For example, if the memory ID is 101, the buffer memory location is the local memory 1, and the buffer memory address is 0x10001, the computing unit corresponding to the buffer local memory is a computing unit corresponding to 0x10001. The task scheduler may send the target task to the computing unit corresponding to 0x10001.

The computer device can support, through the task scheduler, buffer allocation and management of the local device memory. Because access performance of the global memory is poorer than access performance of the local memory, when data exchange is performed in the heterogeneous computing task that requires comparatively high access performance, the heterogeneous computing task may be executed by applying for the local device memory. For example, the computer device determines, through the application routine module, that data is data that is most frequently copied or most frequently used during execution of the heterogeneous computing task. In this case, the application routine module applies for a buffer of the local memory, and subsequently copies the data to the local memory corresponding to the buffer. Therefore, when the heterogeneous computing task is executed, the data is read or written more efficiently. This fully utilizes comparatively high access performance of the local memory. According to the data processing method in this application, it is supported that a corresponding device memory of any level may be applied for a buffer used for data exchange. Therefore, this can meet diversified device memory scenarios and meet requirements of different application scenarios.

517: The computer device sends a third notification message to the task scheduler in the computer device through a computing unit corresponding to the buffer local memory.

After the computing unit corresponding to the buffer local memory executes the target task, the computing unit corresponding to the buffer local memory may send the third notification message to the task scheduler, where the third notification message is used to indicate that the computing unit corresponding to the buffer local memory has executed the target task.

518: The computer device removes, through the task scheduler, a dependency relationship between a dependent task and the target task.

After the task scheduler receives the third notification message, the task scheduler may remove the dependency relationship between the dependent task and the target task.

519: The computer device sends the target task to a computing unit with least load through the task scheduler.

When the task scheduler determines that the buffer memory location corresponding to the memory ID is not the local memory, the task scheduler may send the target task to the computing unit with least load. For example, if the memory ID is 102, the buffer memory location corresponding to the memory ID is the global memory, and the task scheduler may send the target task to the computing unit with least load.

520: The computer device sends a fourth notification message to the task scheduler in the computer device through the computing unit with least load.

After the computing unit with least load receives the target task, the computing unit with least load may execute the target task. After the computing unit with least load executes the target task, the computing unit may send the fourth notification message to the task scheduler. The fourth notification message is used to notify the task scheduler that the target task has been executed.

521: The computer device removes, through the task scheduler, a dependency relationship between a dependent task and the target task.

Step 521 is similar to step 518. Details are not described herein again.

522: The computer device sends the target task to a computing unit with least load in the computer device through the task scheduler.

When the task scheduler determines that the input parameter of the heterogeneous computing task does not include the valid memory ID, it indicates that the heterogeneous computing task does not depend on the applied buffer in the buffer resource pool. In this case, the task scheduler may send the target task to the computing unit with least load.

523: The computer device sends a fifth notification message to the task scheduler in the computer device through the computing unit with least load.

524: The computer device removes, through the task scheduler, a dependency relationship between a dependent task and the target task.

Step 523 and step 524 are similar to step 517 and step 518. Details are not described herein again.

525: The computer device sends the target task to the buffer manager in the computer device through the task scheduler.

After the task scheduler determines that the task type of the target task is the buffer application task or the buffer release task, the task scheduler may send the target task to the buffer manager.

526: The computer device sends a sixth notification message to the task scheduler in the computer device through the buffer manager.

After the buffer manager receives the target task, the buffer manager may execute the target task. For a specific process of executing the target task by the buffer manager, refer to the foregoing process of executing the buffer application task or the buffer release task by the buffer manager in FIG. 3A and FIG. 3B. After the buffer manager executes the target task, the buffer manager may send the sixth notification message to the task scheduler. The sixth notification message is used to notify the task scheduler that the target task has been executed.

527: The computer device removes, through the task scheduler, a dependency relationship between a dependent task and the target task.

Step 527 is similar to step 518. Details are not described herein again.

In this embodiment of this application, the computer device obtains the target task from the task buffer pool in the computer device through the task scheduler. The target task is a task whose preceding task is executed and whose successive task is to be executed, and there is logically a sequential dependency relationship between the preceding task and the successive task. Then, the computer device determines the task type of the target task through the task scheduler. The task scheduler may call, based on the task type of the target task and the target task, the corresponding module in the computer device to execute the target task. Therefore, the task scheduler obtains the target task from the task buffer pool, where the target task is a task whose preceding task is executed and whose successive task is to be executed, and there is logically a sequential dependency relationship between the preceding task and the successive task. When the target task is the buffer application task or the buffer release task, after a preceding task of the buffer application task is executed, the computer device may call, through the task scheduler, the buffer manager in the computer device to execute the buffer application task, and the computer device may immediately dispatch, through the task scheduler, the buffer release task to the buffer manager in the computer device after a preceding task of the buffer release task is executed, where a moment at which the buffer is applied for is postponed and a moment at which the buffer is released is advanced in comparison with the other approaches solution. This improves utilization of a device memory corresponding to the buffer.

In an embodiment of this application, the computer device may call, through the task scheduler, a corresponding module in the computer device based on a task type of a target task and a dependent task group ID carried in the target task, to execute the target task. The following provides detailed descriptions with reference to FIG. 6A and FIG. 6B.

Figure 6A:
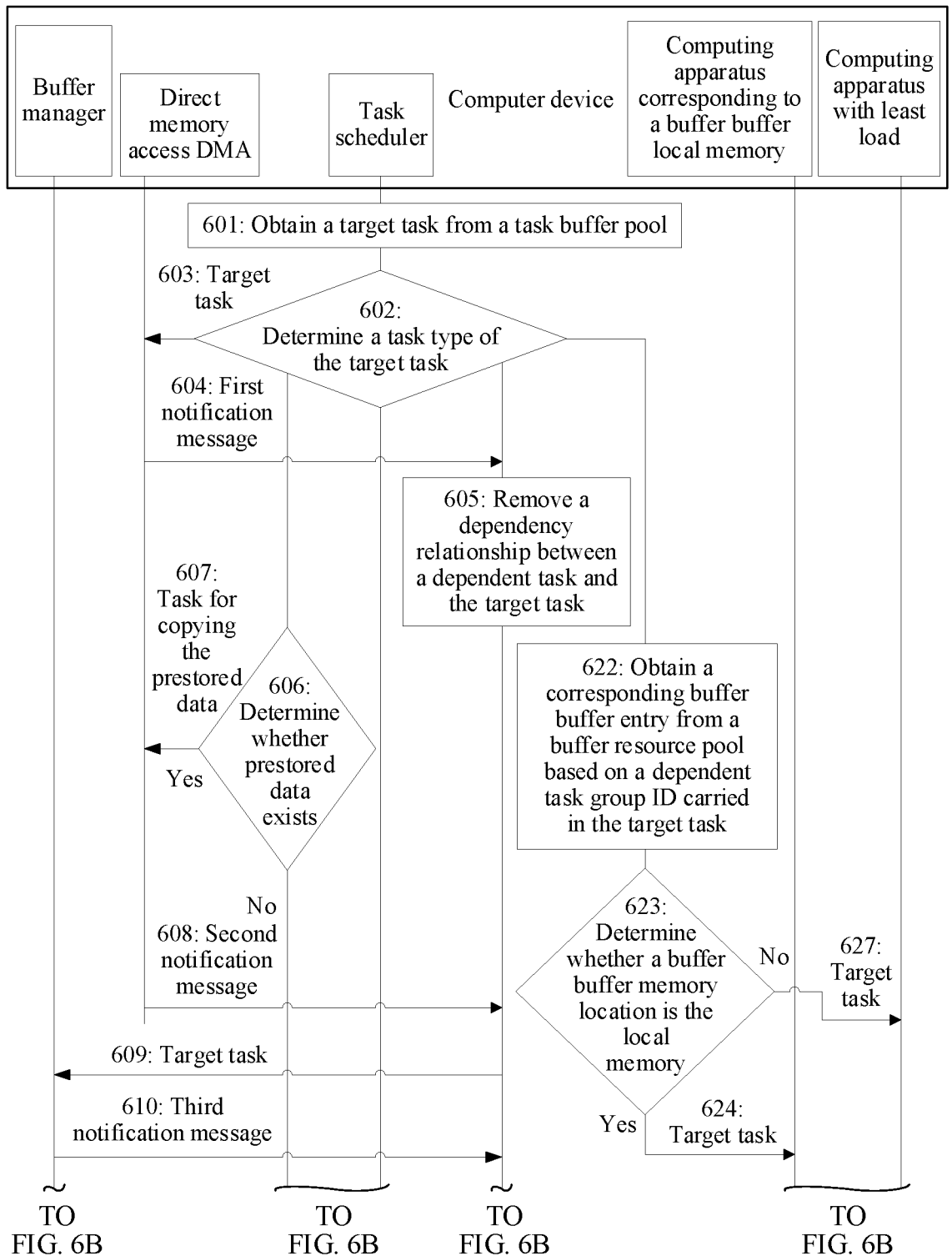
FIG. 6A and FIG. 6B are a schematic diagram of another embodiment of a data processing method according to embodiments of this application.
Figure 6B:
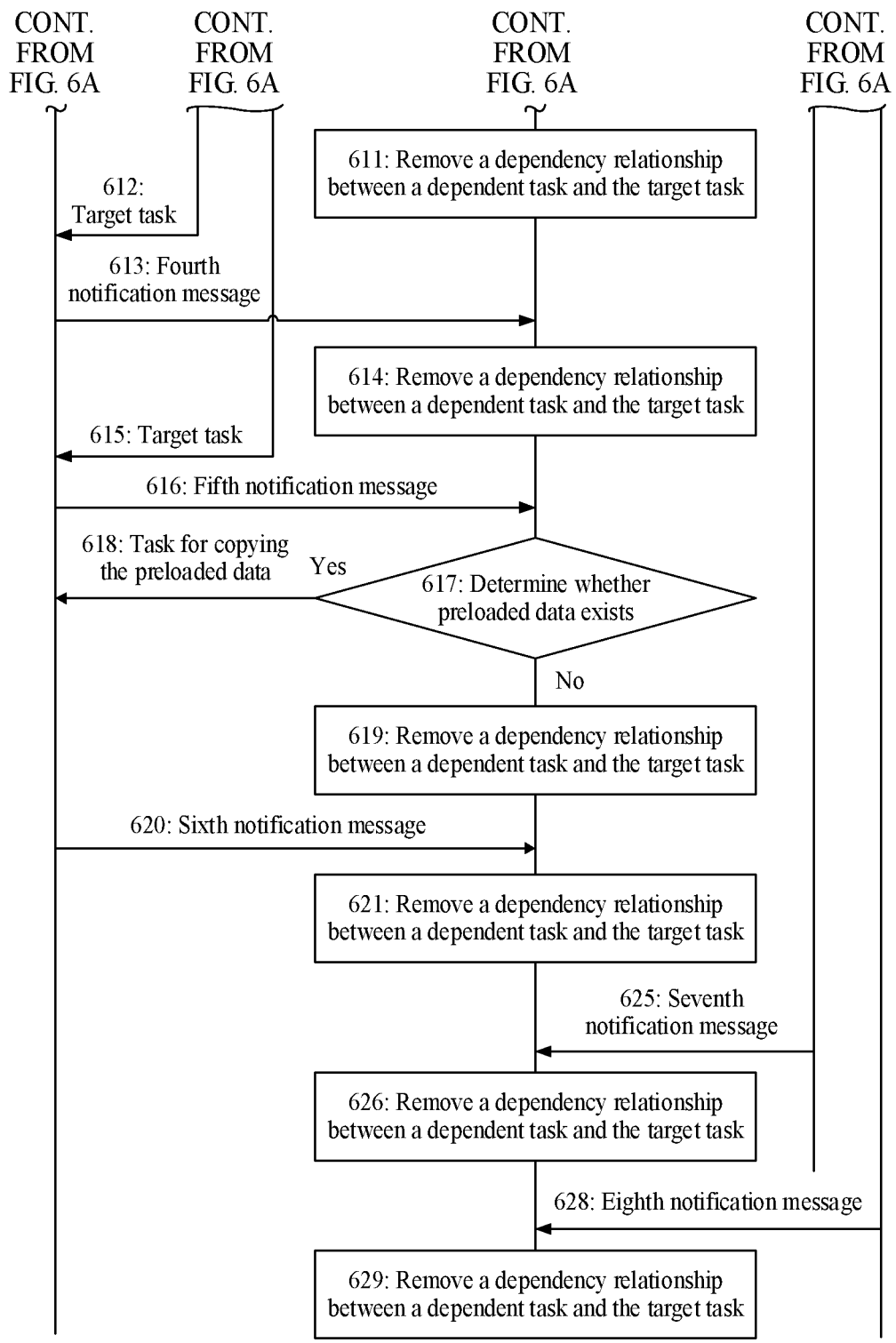

Referring to FIG. 6A and FIG. 6B, in an embodiment of FIG. 6A and FIG. 6B, the computer device calls, through the task scheduler based on the task type of the target task and the dependent task group ID carried in the target task, the corresponding module in the computer device to execute the target task. Another embodiment of the data processing method in the embodiments of this application includes the following steps.

601: The computer device obtains a target task from the task buffer pool in the computer device through the task scheduler.

In a process of running code by the application routine module in the computer device, the application routine module calls the application programming interface of the task generation apparatus in the heterogeneous computing runtime module in the computer device, and then inputs a corresponding application programming interface parameter into the task generation apparatus. Then, the task generation apparatus generates a task based on the application programming interface parameter, and then places the generated task in the task buffer pool in the computer device. The computer device may obtain the target task from the task buffer pool in the computer device through the task scheduler. The target task is a task whose preceding task is executed and whose successive task is to be executed. There is logically a sequential dependency relationship between the preceding task and the successive task. The target task carries a dependent task group ID.

602: The computer device determines a task type of the target task through the task scheduler.

Step 602 is similar to step 502 in FIG. 5A. Details are not described herein again.

603: If the task type of the target task is a memory copy task, the computer device sends the target task to the DMA in the computer device through the task scheduler.

The computer device determines, through the task scheduler, that the task type of the target task is the memory copy task. In this case, the computer device may send the target task to the DMA in the computer device through the task scheduler, and the DMA may execute the memory copy task.

604: The computer device sends a first notification message to the task scheduler in the computer device through the DMA.

605: The computer device removes, through the task scheduler, a dependency relationship between a dependent task and the target task.

Step 604 and step 605 are similar to step 510 and step 511 in FIG. 5B. Details are not described herein again.

606: If the task type of the target task is a buffer release task, the computer device determines, through the task scheduler, whether prestored data exists, and if yes, performs step 607, or if no, performs step 612.

When the task scheduler determines that the task type of the target task is the buffer release task, the task scheduler may determine whether prestored data exists, and if the prestored data exists, performs step 607, or if no prestored data exists, performs step 612. It should be noted that the prestored data may be data that needs to be read/written after a heterogeneous computing task or a data copy task is subsequently executed. Therefore, before a buffer is released, the task scheduler may determine the prestored data, and then copy the prestored data to a target memory.

607: The computer device sends, to the DMA in the computer device through the task scheduler, a task for copying the prestored data.

Figure 7:
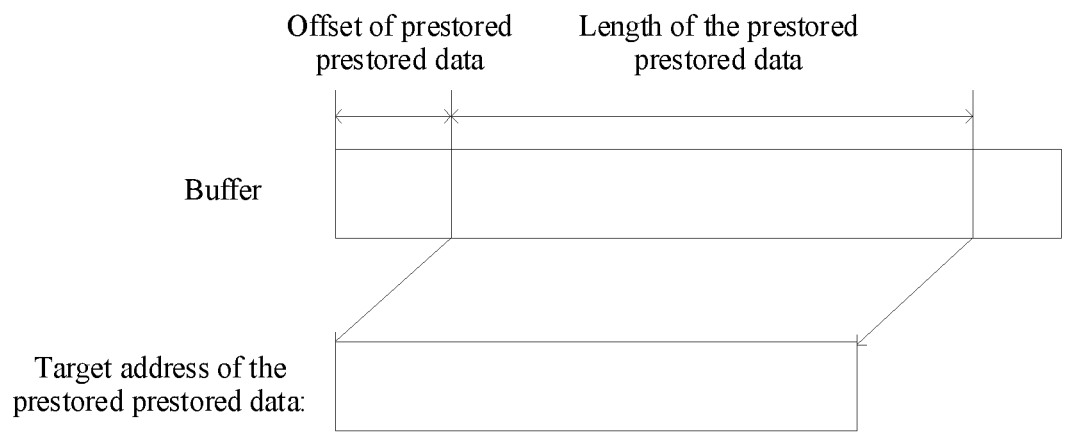
FIG. 7 is a schematic diagram of another application scenario of a data processing method according to an embodiment of this application.

After the computer device determines, through the task scheduler, that the prestored data exists, the computer device may generate, through the task generation apparatus, the task for copying the prestored data, and then the task scheduler may send, to the DMA through the data migration transmitter, the task for copying the prestored data. The task for copying the prestored data carries a storage address of the prestored data, a length of the prestored data, and an offset of the prestored data in the buffer corresponding to the buffer release task. FIG. 7 shows a buffer offset of prestored data in a buffer, a length of the prestored data, and a destination address of the prestored data.

608: The computer device sends a second notification message to the task scheduler in the computer device through the DMA.

After copying the prestored data to the destination address of the prestored data, the DMA may send the second notification message to the task scheduler. The second notification message is used to indicate that the DMA has executed the task for copying the prestored data.

609: The computer device sends the target task to the buffer manager in the computer device through the task scheduler.

After the task scheduler receives the second notification message, because the task scheduler may determine that the prestored data in the buffer corresponding to the buffer release task has been copied to the destination address of the prestored data, the task scheduler may send the target task to the buffer manager, and the buffer manager may release a device memory corresponding to the buffer in time. For a specific process of releasing the buffer by the buffer manager, refer to the process of releasing the buffer in FIG. 4A and FIG. 4B. Details are not described herein again. The device memory corresponding to the buffer is released in time through the buffer manager such that utilization of the device memory corresponding to the buffer is improved.

610: The computer device sends a third notification message to the task scheduler in the computer device through the buffer manager.

611: The computer device removes, through the task scheduler, a dependency relationship between a dependent task and the target task.

Step 610 and step 611 are similar to step 418 and step 419 in FIG. 4B. Details are not described herein again.

612: The computer device sends the target task to the buffer manager in the computer device through the task scheduler.

When the task scheduler determines that no prestored data exists, the task scheduler may send the target task to the buffer manager. After receiving information about the buffer release task, the buffer manager executes the buffer release task based on the foregoing process of releasing a buffer in FIG. 4A and FIG. 4B.

613: The computer device sends a fourth notification message to the task scheduler in the computer device through the buffer manager.

614: The computer device removes, through the task scheduler, a dependency relationship between a dependent task and the target task.

Step 613 and step 614 are similar to step 418 and step 419 in FIG. 4B. Details are not described herein again.

615: If the task type of the target task is a buffer application task, the computer device sends the target task to the buffer manager in the computer device through the task scheduler.

When the task scheduler determines that the task type of the target task is the buffer application task, the task scheduler may send the target task to the buffer manager, and then the buffer manager may apply for the buffer based on the foregoing process of applying for a buffer in FIG. 4A and FIG. 4B.

616: The computer device sends a fifth notification message to the task scheduler in the computer device through the buffer manager.

After the buffer manager applies for the buffer based on the foregoing process of applying for a buffer in FIG. 4A and FIG. 4B, the buffer manager may send the fifth notification message to the task scheduler. The fifth notification message is used to notify the task scheduler that the buffer has been applied for.

617: The computer device determines, through the task scheduler, whether preloaded data exists, and if yes, performs step 618, or if no, performs step 619.

After receiving the fifth notification message, the task scheduler may determine that the buffer has been successfully applied for, and then the task scheduler may determine whether the preloaded data exists, and if yes, performs step 618, or if no, performs step 619. For example, when the heterogeneous computing task that depends on the buffer is subsequently executed, and data in the device memory corresponding to the buffer needs to be read or written, the data needs to be preloaded into the device memory corresponding to the buffer, and the task scheduler may determine that the preloaded data exists such that data is copied for subsequent execution of the heterogeneous computing task by a corresponding computing unit.

618: The computer device sends, through the task scheduler, a task for copying the preloaded data to the buffer manager in the computer device.

Figure 8:
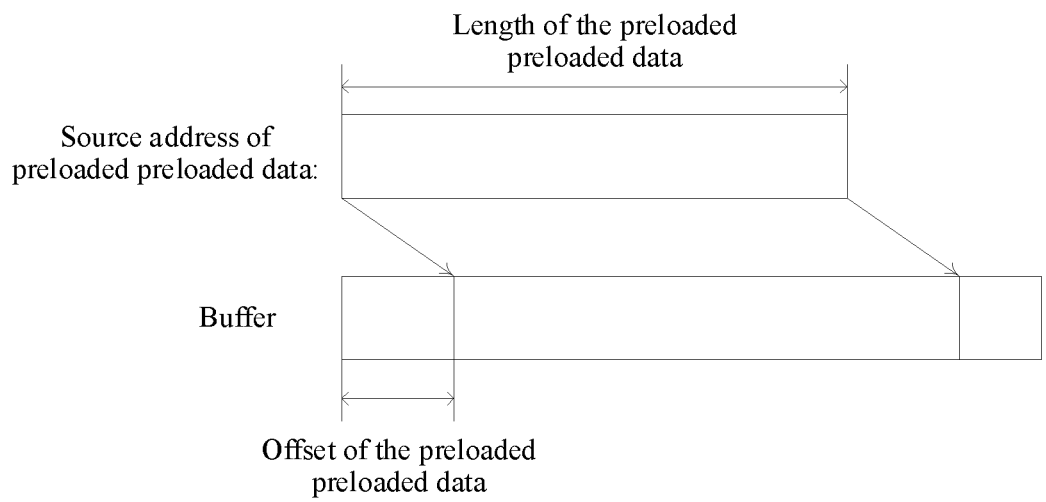
FIG. 8 is a schematic diagram of another application scenario of a data processing method according to an embodiment of this application.

If the task scheduler determines that the preloaded data exists, the task scheduler may send the task for copying the preloaded data to the buffer manager. As shown in FIG. 8, the task for copying the preloaded data includes information such as a source address of the preloaded preloaded data, a length of the preloaded preloaded data, and an offset of the preloaded preloaded data in a buffer.

619: The computer device removes, through the task scheduler, a dependency relationship between a dependent task and the target task.

When the task scheduler determines that no preloaded data exists, the task scheduler may remove the dependency relationship between the buffer application task and the task depending on the buffer application task.

620: The computer device sends a sixth notification message to the task scheduler in the computer device through the buffer manager.

After the DMA executes the task for copying the preloaded data, the buffer manager may send the sixth notification message to the task scheduler. The sixth notification message is used to notify the task scheduler that the task for copying the preloaded data has been executed.

621: The computer device removes, through the task scheduler, a dependency relationship between a dependent task and the target task.

After receiving the sixth notification message, the task scheduler may determine that the task for copying the preloaded data has been executed, and then the task scheduler may remove the dependency relationship between the buffer application task and the task depending on the buffer application task.

622: If the task type of the target task is the heterogeneous computing task, the computer device obtains, through the task scheduler, a corresponding buffer entry from the buffer resource pool in the computer device based on the dependent task group ID carried in the target task.

When the task type of the target task is the heterogeneous computing task, the task scheduler may obtain the corresponding entry from the buffer resource pool based on the dependent task group ID carried in the target task. For example, as shown in Table 4, if the dependent task group ID carried in the target task is an ID corresponding to the dependence task group 1, it may be determined that the buffer entry corresponding to the dependence task group 1 is the buffer entry shown in Table 6. Alternatively, for example, if the dependent task group ID carried in the target task is an ID corresponding to the dependent task group 2, it may be determined that the buffer entry corresponding to the dependent task group 2 is the buffer entry shown in Table 8.

TABLE 8

| Memory size | Memory location | Memory address |
|---|---|---|
| 1000 | Global memory | 0x2014a |

623: The computer device determines, through the task scheduler, whether a memory location of a buffer corresponding to the target task is a local memory, and if yes, performs step 624, or if no, performs step 627.

The task scheduler may determine whether the memory location of the buffer corresponding to the target task is the local memory, and if the memory location of the buffer is the local memory, perform step 624, or if the memory location of the buffer is not the local memory, perform step 627. For example, if the task scheduler determines that the buffer entry corresponding to the dependent task group ID is the buffer entry shown in Table 6, it can be learned that the memory location corresponding to the buffer is the local memory 1. Therefore, the task scheduler may determine that the memory location of the buffer is the local memory.

624: The computer device sends, through the task scheduler, the target task to a computing unit corresponding to the buffer local memory in the computer device.

If the task scheduler determines that the memory location corresponding to the buffer is the local memory, the task scheduler may send the target task to the computing unit corresponding to the buffer local memory. Then, after the computing unit receives the target task, the computing unit may obtain a corresponding buffer memory address from the target task, and the computing unit sets the buffer memory address as an implicit parameter of the target task. After setting an input parameter of the heterogeneous computing task, the computing unit may start to execute the heterogeneous computing task.

Further, the computing unit sets the buffer memory address as the implicit parameter of the target task. The implicit parameter may be stored in a preset buffer address or a preset device memory address. The computing unit determines the buffer memory address by reading the preset register address or the preset device memory address.

In this embodiment, the task scheduler can support buffer allocation and management of a local device memory. Because access performance of a global memory is poorer than access performance of the local memory, when data exchange is performed in the heterogeneous computing task that requires comparatively high access performance, the heterogeneous computing task may be executed by applying for the local device memory. This fully utilizes comparatively high access performance of the local memory. According to the data processing method in this application, it is supported that a corresponding device memory of any level may be applied for a buffer used for data exchange. Therefore, this can meet diversified device memory scenarios and meet requirements of different application scenarios.

625: The computer device sends a seventh notification message to the task scheduler in the computer device through a computing unit corresponding to the local memory of the buffer.

626: The computer device removes, through the task scheduler, a dependency relationship between a dependent task and the target task.

Step 625 and step 626 are similar to step 517 and step 518 in FIG. 5B and FIG. 5C. For details, refer to steps 517 and step 518 in FIG. 5B and FIG. 5C. Details are not described herein again.

627: The computer device sends the target task to a computing unit with least load in the computer device through the task scheduler.

When the memory location of the buffer corresponding to the target task is not the local memory, the task scheduler may determine, from computing units corresponding to the global memory, the computing unit with least load currently, and then send the target task to the computing unit with least load. Then, the computing unit with least load obtains the corresponding buffer memory address from the target task, sets the buffer memory address as an implicit parameter of the heterogeneous computing task, and then may execute the heterogeneous computing task.

628: The computer device sends an eighth notification message to the task scheduler in the computer device through the computing unit with least load.

629: The computer device removes, through the task scheduler, a dependency relationship between a dependent task and the target task.

Step 628 to step 629 are similar to step 520 to step 521 in FIG. 5C. Details are not described herein again.

In this embodiment of this application, the computer device obtains the target task from the task buffer pool in the computer device through the task scheduler. The target task is a task whose preceding task is executed and whose successive task is to be executed, and there is logically a sequential dependency relationship between the preceding task and the successive task. Then, the computer device determines the task type of the target task through the task scheduler. The task scheduler may call, based on the task type of the target task and the target task, the corresponding module to execute the target task. Therefore, the task scheduler obtains the target task from the task buffer pool, where the target task is a task whose preceding task is executed and whose successive task is to be executed, and there is logically a sequential dependency relationship between the preceding task and the successive task. When the target task is the buffer application task or the buffer release task, after a preceding task of the buffer application task is executed, the computer device may call, through the task scheduler, the buffer manager in the computer device to execute the buffer application task, and the computer device may immediately dispatch, through the task scheduler, the buffer release task to the buffer manager in the computer device after a preceding task of the buffer release task is executed, where a moment at which the buffer is applied for is postponed and a moment at which the buffer is released is advanced in comparison with the some other solution. This improves utilization of a device memory corresponding to the buffer.

In an embodiment of this application, when there is only a heterogeneous computing task, the computer device creates only the heterogeneous computing task through the task generation apparatus, and the heterogeneous computing task may carry related information of a buffer, and may further carry prestored data and/or related information of preloaded data. Therefore, the computer device may call, through the task scheduler, a corresponding module in the computer device based on the information carried in the heterogeneous computing task, to execute the corresponding task. The following provides detailed description with reference to an embodiment of FIG. 9A and FIG. 9B.

Figure 9A:
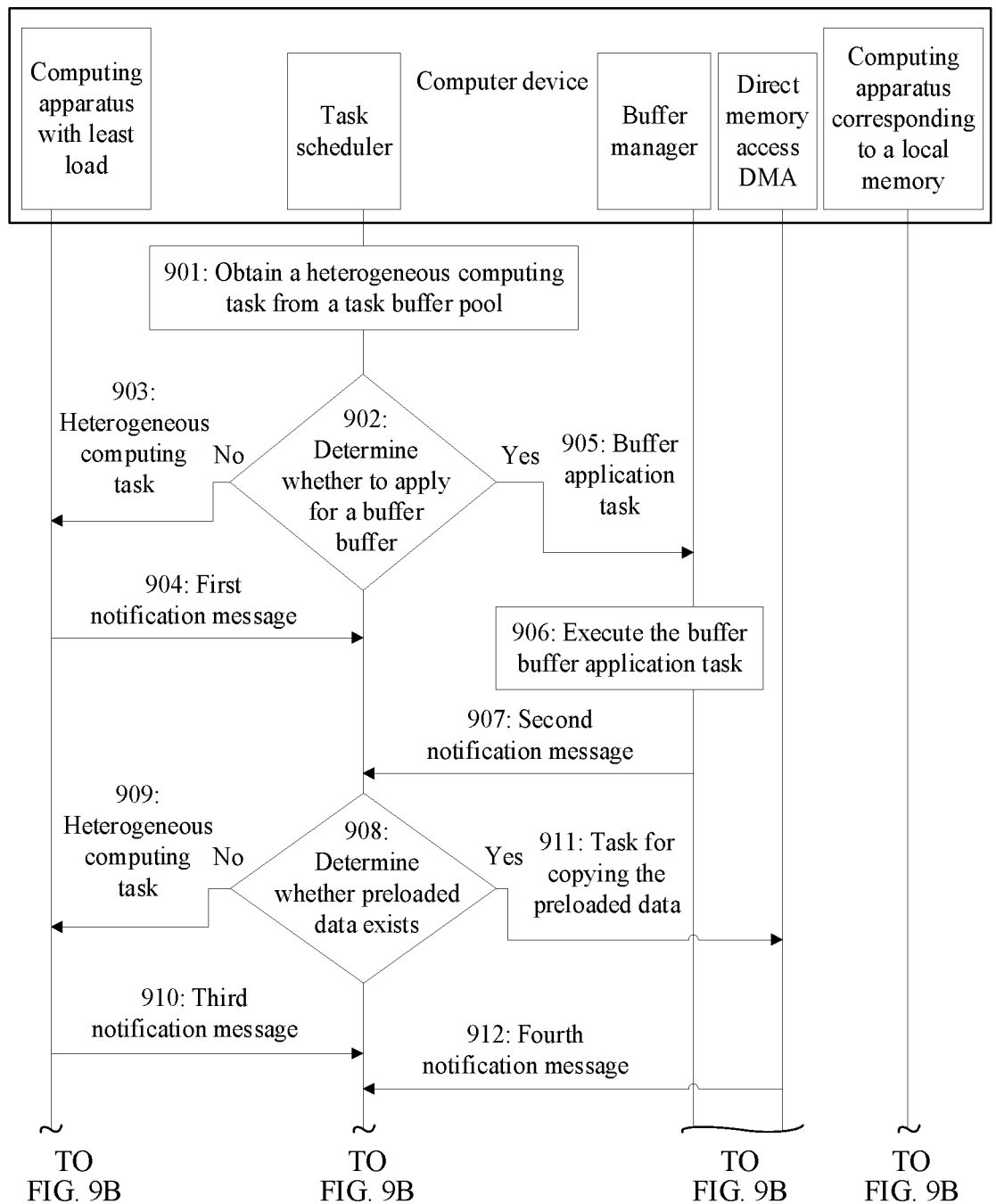
FIG. 9A and FIG. 9B are a schematic diagram of another embodiment of a data processing method according to embodiments of this application.
Figure 9B:
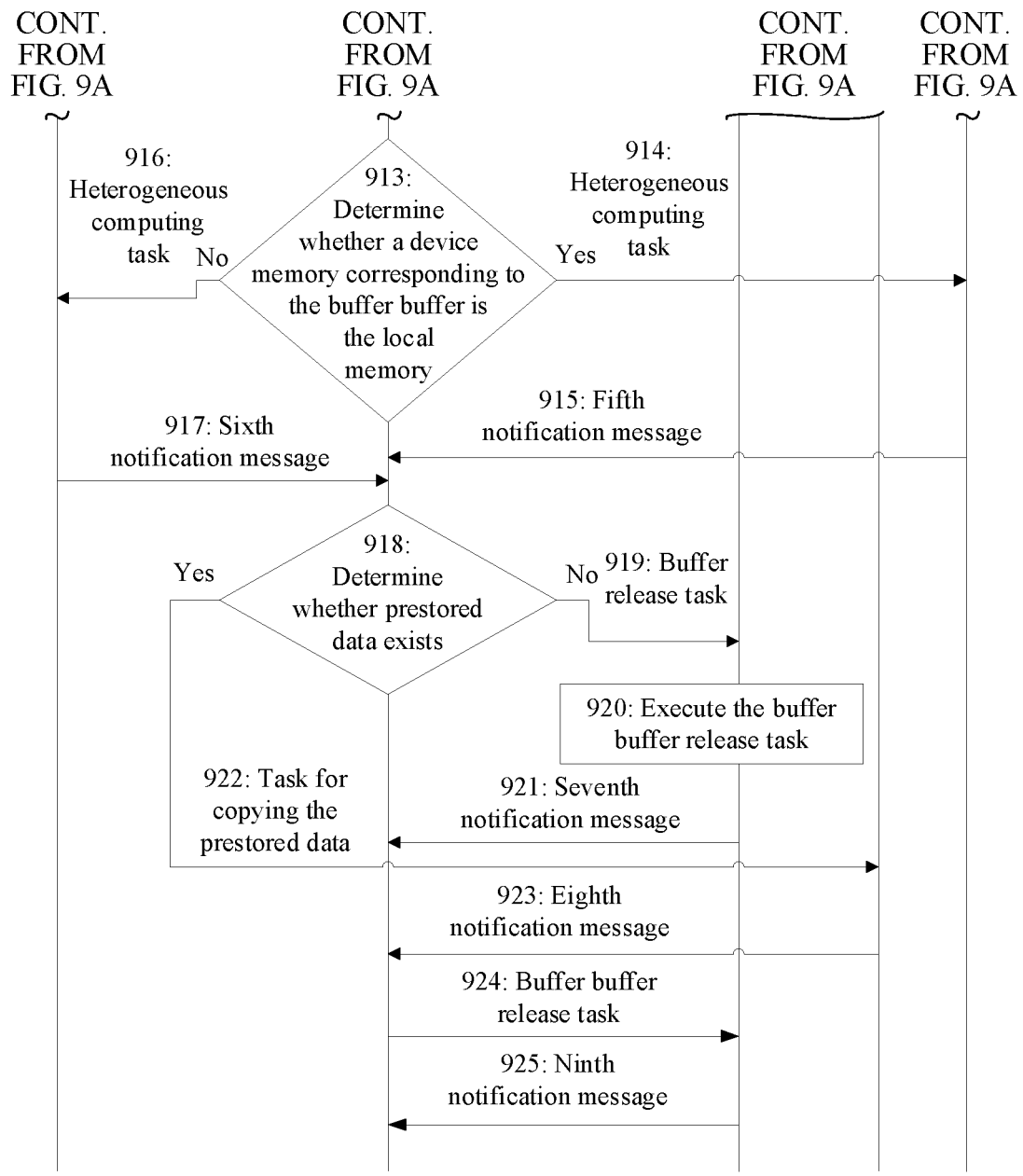

Referring to FIG. 9A and FIG. 9B, in an embodiment of FIG. 9A and FIG. 9B, the computer device calls, through the task scheduler based on an ID, carried in the target task, of the heterogeneous computing task, the corresponding module in the computer device to execute the target task. Another embodiment of the data processing method in the embodiments of this application includes the following steps.

901: The computer device obtains a heterogeneous computing task from the task buffer pool in the computer device through the task scheduler.

In a process of running code by the application routine module in the computer device, the application routine module calls the application programming interface of the task generation apparatus in the heterogeneous computing runtime module in the computer device, and then inputs a corresponding application programming interface parameter into the task generation apparatus. Then, the task generation apparatus generates the heterogeneous computing task based on the application programming interface parameter. When there is only the heterogeneous computing task, the buffer resource pool in the computer device may be a data table in a dimension of heterogeneous computing tasks. For example, the buffer resource pool may be a buffer resource pool shown in Table 9. The task generation apparatus may fill in a buffer entry of the heterogeneous computing task based on the application programming interface parameter, and then create the heterogeneous computing task. The heterogeneous computing task may carry related information of a buffer, and may further carry related information of prestored data and related information of preloaded data. The related information of the buffer may include a memory size of the buffer, a memory location of the buffer, and the like. The related information of the preloaded data may include a source address of the preloaded data, a length of the preloaded data, an offset address of the preloaded data in the buffer, and the like. The related information of the prestored data may include a storage address of the prestored data, a length of the prestored data, an offset address of the prestored data in the buffer, and the like. For example, for a buffer corresponding to a heterogeneous computing task 3 in Table 9, a memory size is 30, a memory location is a local memory 2, and a memory address is a null address. It should be noted that, when execution of the heterogeneous computing task does not need to depend on the buffer, the task generation apparatus does not need to apply to the buffer resource pool in the computer device for the buffer entry corresponding to the heterogeneous computing task, and only needs to create the heterogeneous computing task. Then, the task generation apparatus calls a corresponding computing unit to execute the heterogeneous computing task. The task scheduler obtains the heterogeneous computing task from the task buffer pool in the computer device. The heterogeneous computing task is a task whose preceding task is executed and whose successive task is to be executed, and there is logically a sequential dependency relationship between the preceding task and the successive task.

TABLE 9

| | Memory size | Memory location | Memory address |
|---|---|---|---|
| Heterogeneous computing task 1 | 500 | Local memory 1 | 0x10001 |
| Heterogeneous computing task 2 | 1000 | Global memory | 0x2104a |
| Heterogeneous computing task 3 | 30 | Local memory 2 | Null |
| | . . . | | |

902: The computer device determines, through the task scheduler, whether to apply for the buffer, and if yes, performs step 905, or if no, performs step 903.

When obtaining the heterogeneous computing task, the task scheduler determines whether to apply for the buffer, and if no, performs step 905, or if yes, performs step 903. Further, the task scheduler may determine, based on an ID of the heterogeneous computing task, whether there is the corresponding buffer entry, and the memory address of the buffer entry is the null address.

903: The computer device sends the heterogeneous computing task to a computing unit with least load in the computer device through the task scheduler.

After the task scheduler determines that the buffer does not need to be applied for, the task scheduler may directly schedule the computing unit with least load to execute the heterogeneous computing task. Therefore, when there is only the heterogeneous computing task, the task scheduler does not need to determine a task type, and directly calls a corresponding computing unit to execute the heterogeneous computing task. Therefore, in this application scenario, a process in which the task scheduler executes data exchange of the heterogeneous computing task is easier, and overheads of a processing process are lower.

904: The computer device sends a first notification message to the task scheduler in the computer device through the computing unit with least load.

After executing the heterogeneous computing task, the computing unit with least load may send the first notification message to the task scheduler, to notify the task scheduler that the heterogeneous computing task is executed.

905: The computer device sends a buffer application task to the buffer manager in the computer device through the task scheduler.

After the task scheduler determines that the buffer needs to be applied for, the task generation apparatus in the computer device generates the buffer application task based on the related information of the buffer carried in the heterogeneous computing task, where the buffer application task carries the ID of the heterogeneous computing task, and then sends the buffer application task to the buffer manager in the computer device.

906: The computer device executes the buffer application task through the buffer manager.

After the buffer manager receives the buffer application task, the buffer manager may execute the buffer application task. A specific process of the buffer application task is similar to the process of a buffer application task in FIG. 4A and FIG. 4B. A difference only lies in that in this embodiment, the corresponding buffer entry is obtained based on the ID of the heterogeneous calculation task, and another procedure is similar to the procedure of applying for a buffer by the buffer manager in FIG. 4A and FIG. 4B. Details are not described herein again.

907: The computer device sends a second notification message to the task scheduler in the computer device through the buffer manager.

After the buffer manager executes the buffer application task, the buffer manager may send the second notification message to the task scheduler, to notify the task scheduler that the buffer application task is executed.

908: The computer device determines, through the task scheduler, whether the preloaded data exists, and if yes, performs step 911, or if no, performs step 909.

After obtaining the heterogeneous computing task, the task scheduler determines, based on the related information of the preloaded data carried in the heterogeneous computing task, whether the preloaded data exists, and if yes, performs step 911, or if no, performs step 909. The related information of the preloaded data carried in the heterogeneous computing task may include the information such as the source address of the preloaded data, the length of the preloaded data, and the offset of the preloaded data in the buffer. For details, refer to FIG. 8. FIG. 8 is a schematic diagram of the related information of the preloaded data.

909: The computer device sends the heterogeneous computing task to a computing unit with least load in the computer device through the task scheduler.

If no preloaded data exists, the task scheduler may send the heterogeneous computing task to the computing unit with least load.

910: The computer device sends a third notification message to the task scheduler in the computer device through the computing unit with least load.

Step 910 is similar to step 904. Details are not described herein again.

911: The computer device sends, to the DMA in the computer device through the task scheduler and through the data migration transmitter in the computer device, a task for copying the preloaded data.

Step 911 is similar to step 618 in FIG. 6B. Details are not described herein again.

912: The computer device receives, through the task scheduler, a fourth notification message sent by the DMA in the computer device.

Step 912 is similar to step 620 in FIG. 6B. Details are not described herein again.

913: The computer device determines, through the task scheduler, whether the memory location corresponding to the buffer in the computer device is a local memory, and if yes, performs step 914, or if no, performs step 916.

914: The computer device sends, through the task scheduler, the heterogeneous computing task to a computing unit corresponding to the local memory in the computer device.

915: The computer device receives, through the task scheduler, a fifth notification message sent by the computing unit corresponding to the local memory in the computer device.

Step 913 to step 915 are similar to step 623 to step 625 in FIG. 6B. Details are not described herein again.

916: The computer device sends the heterogeneous computing task to a computing unit with least load in the computer device through the task scheduler.

917: The computer device receives, through the task scheduler, a sixth notification message sent by the computing unit with least load in the computer device.

Step 916 and step 917 are similar to step 627 and step 628 in FIG. 6B. Details are not described herein again.

918: The computer device determines, through the task scheduler, whether the prestored data exists, and if yes, performs step 922, or if no, performs step 919.

The task scheduler determines, based on the heterogeneous computing task, whether the prestored data exists, and if yes, performs step 922, or if no, performs step 919. Further, if the heterogeneous computing task carries the related information of the prestored data, it indicates that the prestored data exists. The related information of the prestored data may include the storage address of the prestored data, the length of the prestored data, and the offset of the prestored data in the buffer corresponding to the buffer release task. Further, as shown in FIG. 7, FIG. 7 shows the buffer offset of the prestored data in the buffer, the length of the prestored data, and the destination address of the prestored data. If the heterogeneous computing task does not carry the related information of the prestored data, it indicates that no prestored data exists.

919: The computer device sends the buffer release task to the buffer manager in the computer device through the task scheduler.

After the task scheduler determines that no prestored data exists, the computer device generates the buffer release task based on the related information of the buffer of the heterogeneous computing task through the task generation apparatus, where the buffer release task carries the ID of the heterogeneous computing task. Then, the computer device sends the buffer release task to the buffer manager in the computer device through the task scheduler.

920: The computer device executes the buffer release task through the buffer manager.

After the buffer manager receives the buffer release task, the buffer manager may obtain the corresponding buffer entry based on the ID of the heterogeneous computing task. A corresponding buffer release process is similar to the buffer release process in FIG. 6A and FIG. 6B. Details are not described herein again.

921: The computer device sends a seventh notification message to the task scheduler in the computer device through the buffer manager.

Step 921 is similar to step 613 in FIG. 6B. Details are not described herein again.

922: The computer device sends, to the DMA in the computer device through the task scheduler and through the data migration transmitter in the computer device, a task for copying the prestored data.

923: The computer device receives, through the task scheduler, an eighth notification message sent by the DMA in the computer device.

924: The computer device sends the buffer release task to the buffer manager in the computer device through the task scheduler.

925: The computer device sends a ninth notification message to the task scheduler in the computer device through the buffer manager.

Step 922 to step 925 are similar to step 607 to step 610 in FIG. 6A. Details are not described herein again.

In this embodiment of this application, the computer device obtains the heterogeneous computing task from the task buffer pool in the computer device through the task scheduler. The heterogeneous computing task is a task whose preceding task is executed and whose successive task is to be executed. There is logically a sequential dependency relationship between the heterogeneous computing task and the preceding task. Then, the computer device determines, based on the heterogeneous computing task through the task scheduler, whether to apply for the buffer. When determining that the buffer needs to be applied for, the task scheduler sends the buffer application task to the buffer manager in the computer device. After the heterogeneous computing task is executed, the task scheduler sends the buffer release task to the buffer manager. Therefore, after a preceding task of the buffer application task is executed, the computer device may call, through the task scheduler, the buffer manager in the computer device to execute the buffer application task, and the computer device may immediately dispatch, through the task scheduler, the buffer release task to the buffer manager in the computer device after a preceding task of the buffer release task is executed, where a moment at which the buffer is applied for is postponed and a moment at which the buffer is released is advanced in comparison with the some other solution. This improves utilization of a device memory corresponding to the buffer.

Figure 10:
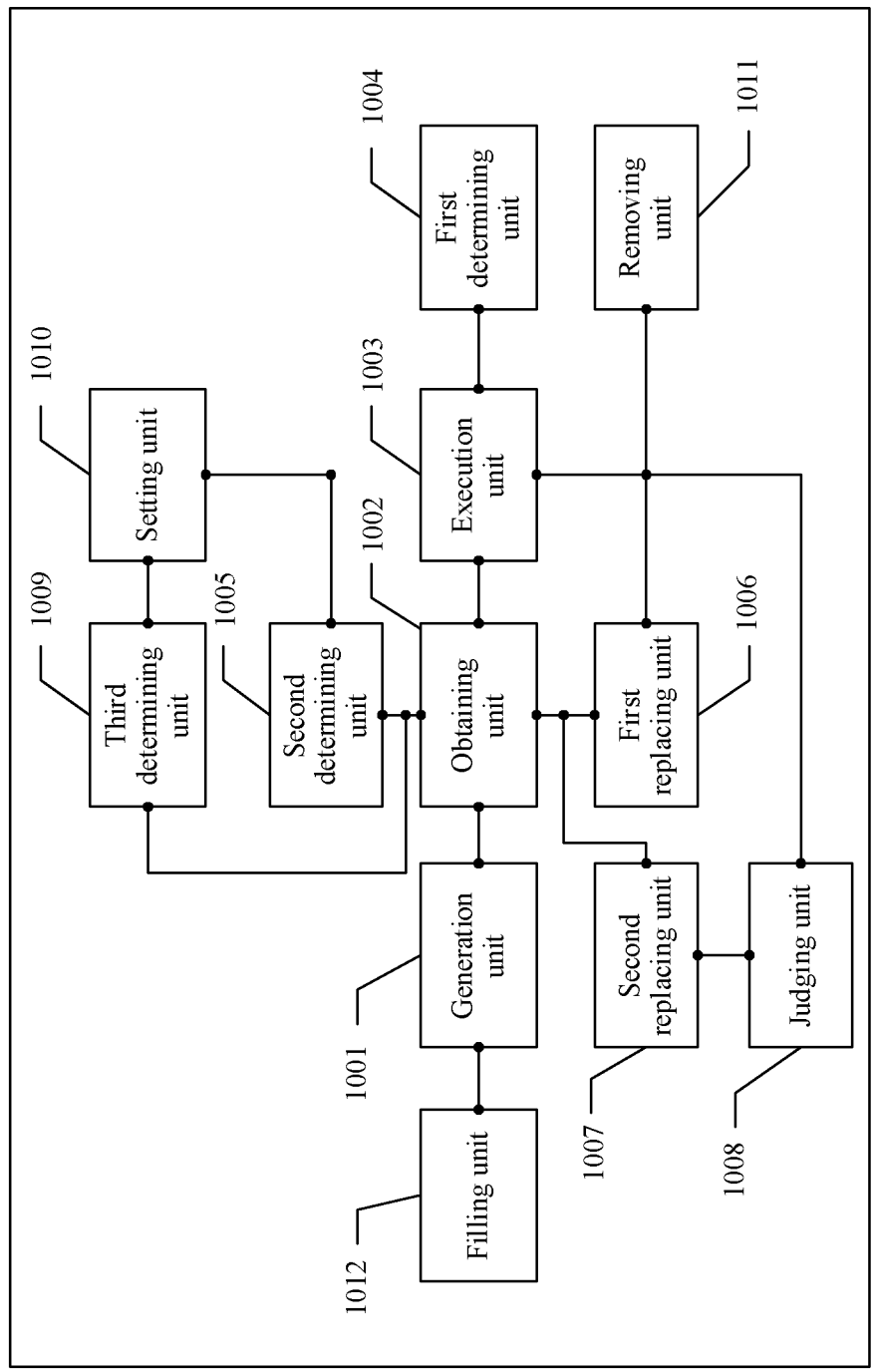
FIG. 10 is a schematic structural diagram of a computer device according to an embodiment of this application.

The foregoing describes the data processing method in the embodiments of this application. The following describes a computer device in the embodiments of this application. Referring to FIG. 10, a first determining unit 1004, a second determining unit 1005, a first replacing unit 1006, a second replacing unit 1007, a judging unit 1008, a third determining unit 1009, a setting unit 1010, a removing unit 1011, and a filling unit 1012 are optional units. An embodiment of a computer device in the embodiments of this application includes a generation unit 1001 configured to generate a target task, where the target task includes a buffer application task or a buffer release task, the target task is a successive task of a first task and is a preceding task of a second task, the first task and the second task are to-be-executed tasks between which there is a sequential dependency relationship, and when the target task is the buffer application task, a buffer corresponding to the buffer application task is used when the second task is executed, or when the target task is the buffer release task, a buffer corresponding to the buffer release task is used when the first task is executed, an obtaining unit 1002 configured to, after a preceding task of the target task is executed and before a successive task of the target task is executed, obtain, based on the target task, a buffer entry corresponding to the target task, where the buffer entry is an entry including a memory size of a buffer corresponding to the target task, a memory location of the buffer, and a memory address of the buffer, and an execution unit 1003 configured to execute the target task to apply for or release the buffer corresponding to the target task.

In this embodiment, the target task includes an ID of the buffer corresponding to the target task, and the obtaining unit 1002 is further configured to obtain, based on the memory ID, the buffer entry corresponding to the target task.

In this embodiment, the target task is the buffer application task, and the execution unit 1003 is further configured to determine the memory size of the buffer and the memory location of the buffer from the buffer entry, determine a corresponding device memory for the buffer based on the memory size of the buffer and the memory location of the buffer, and update the memory address of the buffer in the buffer entry based on the device memory.

In this embodiment, the target task is the buffer release task, and the execution unit 1003 is further configured to determine, from the buffer entry, the memory address of the buffer corresponding to the target task, release a device memory corresponding to the memory address of the buffer, and delete the buffer entry.

In this embodiment, the target task includes a dependent task group ID, and the obtaining unit 1002 is further configured to obtain, based on the dependent task group ID, the buffer entry corresponding to the target task.

In this embodiment, the target task is the buffer application task, and the execution unit 1003 is further configured to determine whether the memory location that is of the buffer corresponding to the target task and that is in the buffer entry is located in a local memory, and if the memory location of the buffer is located in the local memory, determine a target local memory according to a preset policy, and update the memory address of the buffer and the memory location of the buffer in the buffer entry based on the target local memory, or if the memory location of the buffer is not located in the local memory, set the memory location of the buffer to a global memory, and update the memory address of the buffer and the memory location of the buffer in the buffer entry based on the global memory.

In this embodiment, the target task is the buffer release task, and the execution unit 1003 is further configured to determine the memory address of the buffer corresponding to the target task in the buffer entry, release a device memory corresponding to the memory address of the buffer, and set the memory address of the buffer in the buffer entry to a null address.

In this embodiment, the target task is the buffer application task, and the computer device further includes the first determining unit 1004 configured to determine that preloaded data exists, the generation unit 1001 is further configured to generate a task for copying the preloaded data, and the execution unit 1003 is further configured to execute the task for copying the preloaded data.

In this embodiment, the target task is the buffer release task, and the computer device further includes the second determining unit 1005 configured to determine that prestored data exists, the generation unit 1001 is further configured to generate a task for copying the prestored data, and the execution unit 1003 is further configured to execute the task for copying the prestored data.

In this embodiment, if the target task is a memory copy task, a data copy source address that corresponds to the memory copy task and that is carried in the target task is a valid memory ID and/or a data copy destination address that corresponds to the memory copy task and that is carried in the target task is a valid memory ID, the obtaining unit 1002 is further configured to obtain, based on the memory ID, a buffer entry corresponding to the memory ID, the computer device further includes the first replacing unit 1006 configured to replace the memory ID carried in the target task with the memory address of the buffer in the buffer entry, and the execution unit 1003 is further configured to execute the memory copy task.

In this embodiment, if the target task is a heterogeneous computing task, and an input parameter of the target task includes a valid memory ID, the obtaining unit 1002 is further configured to obtain, based on the memory ID, a buffer entry corresponding to the memory ID, the computer device further includes the second replacing unit 1007 configured to replace the memory ID in the input parameter with the memory address of the buffer in the buffer entry, the judging unit 1008 configured to determine whether a buffer memory location corresponding to the memory ID is located in a local memory, and the execution unit 1003 is further configured to, if the buffer memory location corresponding to the memory ID is located in the local memory, execute the heterogeneous computing task based on the local memory.

In this embodiment, if the target task is a heterogeneous computing task, and the target task includes a dependent task group ID, the obtaining unit 1002 is further configured to obtain a buffer entry corresponding to the dependent task group ID, the computer device further includes the third determining unit 1009 configured to determine that a buffer memory location in the buffer entry is located in a local memory, and the setting unit 1010 configured to set a buffer memory address in the buffer entry as an implicit parameter of the heterogeneous computing task, and the execution unit 1003 is further configured to execute the heterogeneous computing task based on the local memory.

In this embodiment, the computer device further includes the removing unit 1011 configured to remove a dependency relationship between the target task and a task depending on the target task.

In this embodiment, the target task is the buffer application task, and the generation unit 1001 is further configured to apply for the buffer entry for the buffer corresponding to the target task and the memory ID corresponding to the buffer entry, fill in the buffer entry based on an application programming interface parameter, where the application programming interface parameter is a parameter generated when the computer device calls an application programming interface of the computer device, and the buffer memory address in the buffer entry is a null address, and generate the buffer application task based on the buffer entry, where the buffer application task includes the memory ID corresponding to the buffer entry.

In this embodiment, the target task is the buffer application task, and the generation unit 1001 is further configured to fill in, based on an application programming interface parameter, a buffer entry corresponding to the dependent task group ID, where the application programming interface parameter is a parameter generated when the computer device calls an application programming interface of the computer device, and the buffer memory address in the buffer entry is a null address, and generate the buffer application task based on the buffer entry, where the buffer application task includes the dependent task group ID.

In this embodiment, the target task is the buffer release task, and the buffer release task includes a memory ID of the buffer corresponding to the buffer release task.

In this embodiment, the target task is the buffer release task, and the buffer release task includes a dependent task group ID of the buffer corresponding to the buffer release task.

In this embodiment, the target task is the buffer application task, and the generation unit 1001 is further configured to determine that a heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, fill in, based on the related information of the buffer, a buffer entry corresponding to the heterogeneous computing task, and generate the buffer application task based on the buffer entry.

In this embodiment, the target task is the buffer release task, and the generation unit 1001 is further configured to determine that a heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, obtain the buffer entry corresponding to the target task, and generate the buffer release task based on the buffer entry.

In this embodiment, the heterogeneous computing task further includes related information of preloaded data, and the related information of the preloaded data includes a source address of the preloaded data, a length of the preloaded data, and an offset address of the preloaded data in the buffer, and the generation unit 1001 is further configured to generate, based on the related information of the preloaded data, a task for copying the preloaded data, and the execution unit 1003 is further configured to execute the task for copying the preloaded data.

In this embodiment, the heterogeneous computing task further includes related information of prestored data, and the related information of the prestored data includes a storage address of the prestored data, a length of the prestored data, and an offset address of the prestored data in the buffer, and the generation unit 1001 is further configured to generate, based on the related information of the prestored data, a task for copying the prestored data, and the execution unit 1003 is further configured to execute the task for copying the prestored data.

In this embodiment, the computer device further includes the filling unit 1012 configured to fill in, based on an application programming interface parameter, the buffer entry corresponding to the heterogeneous computing task, where the application programming interface parameter is a parameter generated when the computer device calls an application programming interface of the computer device, and the generation unit 1001 is further configured to generate the heterogeneous computing task based on the buffer entry, where the heterogeneous computing task includes the related information of the buffer corresponding to the heterogeneous computing task.

In this embodiment of this application, the generation unit 1001 generates the target task, where the target task includes the buffer application task or the buffer release task, the target task is the successive task of the first task and is the preceding task of the second task, the first task and the second task are the to-be-executed tasks between which there is the sequential dependency relationship, and when the target task is the buffer application task, the buffer corresponding to the buffer application task is used when the second task is executed, or when the target task is the buffer release task, the buffer corresponding to the buffer release task is used when the first task is executed. After the preceding task of the target task is executed and before the successive task of the target task is executed, the obtaining unit 1002 may obtain, based on the target task, the buffer entry corresponding to the target task, where the buffer entry is the entry including the memory size of the buffer corresponding to the target task, the memory location of the buffer, and the memory address of the buffer. Then, the execution unit 1003 executes the target task to apply for or release the buffer corresponding to the target task. Therefore, before the computer device applies for the buffer or releases the buffer, the computer device may determine that the execution unit 1003 executes the target task only after the preceding task of the target task is executed and before the successive task of the target task is executed. Therefore, the execution unit 1003 may apply for the buffer after the preceding task of the target task is executed and before the successive task of the target task is executed, and the execution unit 1003 may release the buffer immediately after the preceding task of the target task is executed, where a moment at which the buffer is applied for is postponed and a moment at which the buffer is released is advanced in comparison with the other approaches solution. This improves utilization of a device memory corresponding to the buffer.

Figure 11:
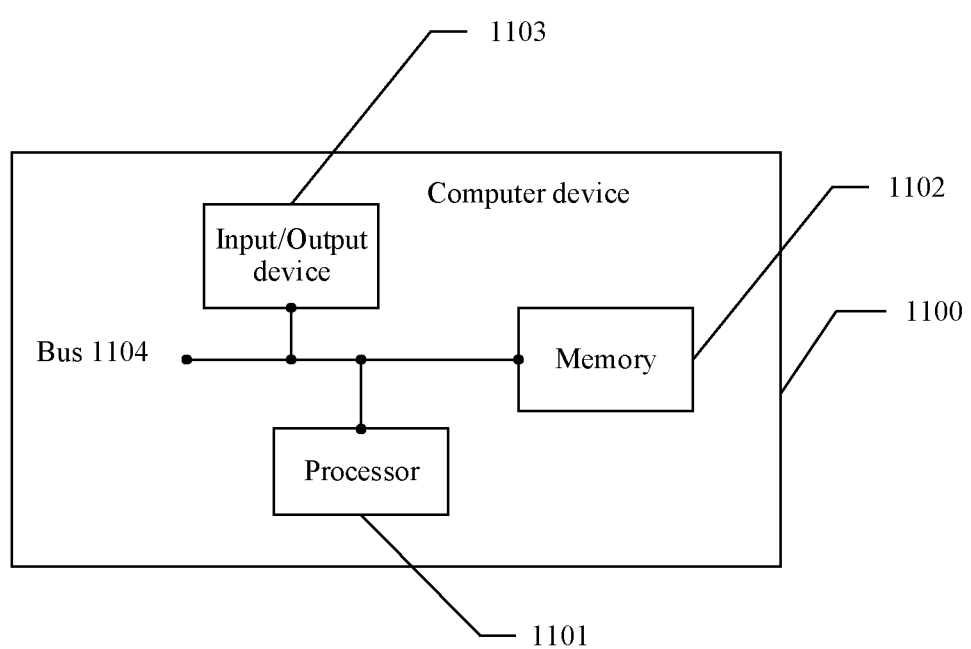
FIG. 11 is another schematic structural diagram of a device according to an embodiment of this application.

This application further provides a computer device 1100. Referring to FIG. 11, an embodiment of the computer device in the embodiments of this application includes a processor 1101, a memory 1102, an input/output device 1103, and a bus 1104, where the processor 1101, the memory 1102, and the input/output device 1103 all are connected to the bus 1104, and the memory stores a computer instruction, the processor 1101 is configured to generate a target task, where the target task includes a buffer application task or a buffer release task, the target task is a successive task of a first task and is a preceding task of a second task, the first task and the second task are to-be-executed tasks between which there is a sequential dependency relationship, and when the target task is the buffer application task, a buffer corresponding to the buffer application task is used when the second task is executed, or when the target task is the buffer release task, a buffer corresponding to the buffer release task is used when the first task is executed, the input/output device 1103 is configured to after a preceding task of the target task is executed and before a successive task of the target task is executed, obtain, based on the target task, a buffer entry corresponding to the target task, where the buffer entry is an entry including a memory size of a buffer corresponding to the target task, a memory location of the buffer, and a memory address of the buffer, and the processor 1101 configured to execute the target task to apply for or release the buffer corresponding to the target task.

In a possible implementation, the target task includes an ID of the buffer corresponding to the target task, and the input/output device 1103 is further configured to obtain, based on the memory ID, the buffer entry corresponding to the target task.

In another possible implementation, the target task is the buffer application task, and the processor 1101 is further configured to determine the memory size of the buffer and the memory location of the buffer from the buffer entry, determine a corresponding device memory for the buffer based on the memory size of the buffer and the memory location of the buffer, and update the memory address of the buffer in the buffer entry based on the device memory.

In another possible implementation, the target task is the buffer release task, and the processor 1101 is further configured to determine, from the buffer entry, the memory address of the buffer corresponding to the target task, release a device memory corresponding to the memory address of the buffer, and delete the buffer entry.

In another possible implementation, the target task includes a dependent task group ID, and the input/output device 1103 is further configured to obtain, based on the dependent task group ID, the buffer entry corresponding to the target task.

In another possible implementation, the target task is the buffer application task, and the processor 1101 is further configured to determine whether the memory location that is of the buffer corresponding to the target task and that is in the buffer entry is located in a local memory, and if the memory location of the buffer is located in the local memory, determine a target local memory according to a preset policy, and update the memory address of the buffer and the memory location of the buffer in the buffer entry based on the target local memory, or if the memory location of the buffer is not located in the local memory, set the memory location of the buffer to a global memory, and update the memory address of the buffer and the memory location of the buffer in the buffer entry based on the global memory.

In another possible implementation, the target task is the buffer release task, and the processor 1101 is further configured to determine the memory address of the buffer corresponding to the target task in the buffer entry, release a device memory corresponding to the memory address of the buffer, and set the memory address of the buffer in the buffer entry to a null address.

In another possible implementation, the target task is the buffer application task, and the processor 1101 is further configured to determine that preloaded data exists, generate a task for copying the preloaded data, and execute the task for copying the preloaded data.

In another possible implementation, the target task is the buffer release task, and the processor 1101 is further configured to determine that prestored data exists, generate a task for copying the prestored data, and execute the task for copying the prestored data.

In another possible implementation, if the target task is a memory copy task, a data copy source address that corresponds to the memory copy task and that is carried in the target task is a valid memory ID and/or a data copy destination address that corresponds to the memory copy task and that is carried in the target task is a valid memory ID, the input/output device 1103 is further configured to obtain, based on the memory ID, a buffer entry corresponding to the memory ID, and the processor 1101 is further configured to replace the memory ID carried in the target task with the memory address of the buffer in the buffer entry, and execute the memory copy task.

In another possible implementation, if the target task is a heterogeneous computing task, and an input parameter of the target task includes a valid memory ID, the input/output device 1103 is further configured to obtain, based on the memory ID, a buffer entry corresponding to the memory ID, the processor 1101 is further configured to replace the memory ID in the input parameter with the memory address of the buffer in the buffer entry, determine whether a buffer memory location corresponding to the memory ID is located in a local memory, and if the buffer memory location corresponding to the memory ID is located in the local memory, execute the heterogeneous computing task based on the local memory.

In another possible implementation, if the target task is a heterogeneous computing task, and the target task includes a dependent task group ID, the input/output device 1103 is further configured to obtain a buffer entry corresponding to the dependent task group ID, and the processor 1101 is further configured to determine that a buffer memory location in the buffer entry is located in a local memory, set a buffer memory address in the buffer entry as an implicit parameter of the heterogeneous computing task, and execute the heterogeneous computing task based on the local memory.

In another possible implementation, the processor 1101 is further configured to remove a dependency relationship between the target task and a task depending on the target task.

In another possible implementation, the target task is the buffer application task, and the processor 1101 is further configured to apply for the buffer entry for the buffer corresponding to the target task and the memory ID corresponding to the buffer entry, fill in the buffer entry based on an application programming interface parameter, where the application programming interface parameter is a parameter generated when the computer device calls an application programming interface of the computer device, and the buffer memory address in the buffer entry is a null address, and generate the buffer application task based on the buffer entry, where the buffer application task includes the memory ID corresponding to the buffer entry.

In another possible implementation, the target task is the buffer application task, and the processor 1101 is further configured to fill in, based on an application programming interface parameter, a buffer entry corresponding to the dependent task group ID, where the application programming interface parameter is a parameter generated when the computer device calls an application programming interface of the computer device, and the buffer memory address in the buffer entry is a null address, and generate the buffer application task based on the buffer entry, where the buffer application task includes the dependent task group ID.

In another possible implementation, the target task is the buffer release task, and the buffer release task includes a memory ID of the buffer corresponding to the buffer release task.

In another possible implementation, the target task is the buffer release task, and the buffer release task includes a dependent task group ID of the buffer corresponding to the buffer release task.

In another possible implementation, the target task is the buffer application task, and the processor 1101 is further configured to determine that a heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, fill in, based on the related information of the buffer, a buffer entry corresponding to the heterogeneous computing task, and generate the buffer application task based on the buffer entry.

In another possible implementation, the target task is the buffer release task, and the processor 1101 is further configured to determine that a heterogeneous computing task carries related information of the buffer corresponding to the target task, where the heterogeneous computing task is a task generated by the computer device, the heterogeneous computing task is a task whose preceding task is executed and whose successive task is to be executed, and the related information of the buffer includes a memory size of a buffer corresponding to the heterogeneous computing task, a memory address of the buffer, and a memory location of the buffer, obtain the buffer entry corresponding to the target task, and generate the buffer release task based on the buffer entry.

In another possible implementation, the heterogeneous computing task further includes related information of preloaded data, and the related information of the preloaded data includes a source address of the preloaded data, a length of the preloaded data, and an offset address of the preloaded data in the buffer, and the processor 1101 is further configured to generate, based on the related information of the preloaded data, a task for copying the preloaded data, and execute the task for copying the preloaded data.

In another possible implementation, the heterogeneous computing task further includes related information of prestored data, and the related information of the prestored data includes a storage address of the prestored data, a length of the prestored data, and an offset address of the prestored data in the buffer, and the processor 1101 is further configured to generate, based on the related information of the prestored data, a task for copying the prestored data, and execute the task for copying the prestored data.

In another possible implementation, the processor 1101 is further configured to fill in, based on an application programming interface parameter, the buffer entry corresponding to the heterogeneous computing task, where the application programming interface parameter is a parameter generated when the computer device calls an application programming interface of the computer device, and generate the heterogeneous computing task based on the buffer entry, where the heterogeneous computing task includes the related information of the buffer corresponding to the heterogeneous computing task.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In another possible design, when the computer device is a chip in a terminal, the chip includes a processing unit and a communications unit. The processing unit may be, for example, a processor. The communications unit may be, for example, an input/output interface, a pin, or a circuit. The processing unit may execute a computer executable instruction stored in a storage unit, to enable the chip in the terminal to perform the data processing method in any design of the first aspect. Optionally, the storage unit is the storage unit in the chip, for example, a register or a buffer. Alternatively, the storage unit may be a storage unit in the terminal but outside the chip, for example, a read-only memory (ROM), another type of static storage device that can store static information and an instruction, or a random-access memory (RAM).

The foregoing processor may be a general-purpose CPU, a microprocessor, an application-specific integrated circuit (ASIC), or one or more integrated circuits for controlling program execution of the data processing method in the first aspect.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data processing method implemented by a computer device, comprising:
   generating a target task comprising a buffer application task or a buffer release task, wherein the target task is a successive task of a first task and is a preceding task of a second task, wherein the first task and the second task are to-be-executed tasks and comprise a sequential dependency relationship between them, wherein a first buffer corresponding to the buffer application task is for use when the target task is the buffer application task and the second task is executed, and wherein a second buffer corresponding to the buffer release task is for use when the target task is the buffer release task and the first task is executed;
   obtaining a buffer entry corresponding to the target task after a preceding task of the target task is executed and before a successive task of the target task is executed, wherein the buffer entry comprises a memory size of a third buffer corresponding to the target task, a memory location of the third buffer, and a memory address of the third buffer; and
   executing the target task to apply for or release the third buffer.

2. The data processing method of claim 1, wherein the target task further comprises a memory identity (ID) of the third buffer, and wherein the data processing method further comprises obtaining, based on the memory ID, the buffer entry.

3. The data processing method of claim 2, wherein the target task is the buffer application task, and wherein the data processing method further comprises:
   determining the memory size and the memory location from the buffer entry;
   determining a device memory for the third buffer based on the memory size and the memory location; and
   updating the memory address based on the device memory.

4. The data processing method of claim 2, wherein the target task is the buffer release task, and wherein the data processing method further comprises:
   determining the memory address from the buffer entry;
   releasing a device memory corresponding to the memory address; and
   deleting the buffer entry.

5. The data processing method of claim 2, wherein the target task is the buffer application task, and wherein the data processing method further comprises:
   applying for the buffer entry for the third buffer and the memory ID;
   generating an application programming interface parameter when the computer device calls an application programming interface;

filling in the buffer entry based on the application programming interface parameter, wherein the memory address is a null address; and
generating the buffer application task based on the buffer entry, wherein the buffer application task comprises the memory ID.

6. The data processing method of claim 1, wherein the target task further comprises a dependent task group identity (ID), and wherein the data processing method further comprises obtaining, based on the dependent task group ID, the buffer entry.

7. The data processing method of claim 6, wherein the target task is the buffer application task, and wherein the data processing method further comprises:
determining whether the memory location is located in a local memory;
when the memory location is located in the local memory:
determining a target local memory according to a preset policy; and
updating the memory address and the memory location based on the target local memory; and
when the memory location is not located in the local memory:
setting the memory location to a global memory; and
updating the memory address and the memory location based on the global memory.

8. The data processing method of claim 1, wherein the target task is a memory copy task, wherein a data copy source address and/or a data copy destination address corresponding to the memory copy task is a valid memory identity (ID), and wherein the data processing method further comprises:
obtaining, based on the valid memory ID, a second buffer entry corresponding to the valid memory ID;
replacing the valid memory ID with a second memory address of a fourth buffer in the second buffer entry; and
executing the memory copy task.

9. The data processing method of claim 1, wherein the target task is a heterogeneous computing task, wherein an input parameter of the target task comprises a valid memory identity (ID), and wherein the data processing method further comprises:
obtaining, based on the valid memory ID, a second buffer entry corresponding to the valid memory ID;
replacing the valid memory ID with a second memory address of a fourth buffer in the second buffer entry;
determining whether a buffer memory location corresponding to the valid memory ID is located in a local memory; and
executing the heterogeneous computing task based on the local memory when the buffer memory location is located in the local memory.

10. A computer device comprising:
a memory configured to store instructions; and
a processor coupled to the memory, wherein the instructions cause the processor to be configured to:
generate a target task comprising a buffer application task or a buffer release task, wherein the target task is a successive task of a first task and is a preceding task of a second task, wherein the first task and the second task are to-be-executed tasks and comprise a sequential dependency relationship between them, wherein a first buffer corresponding to the buffer application task is for use when the target task is the buffer application task and the second task is executed, and wherein a second buffer corresponding to the buffer release task is for use when the target task is the buffer release task and the first task is executed;
obtain, based on the target task, a buffer entry corresponding to the target task after a preceding task of the target task is executed and before a successive task of the target task is executed, wherein the buffer entry comprises a memory size of a third buffer corresponding to the target task, a memory location of the third buffer, and a memory address of the third buffer; and
execute the target task to apply for or release the third buffer.

11. The computer device of claim 10, wherein the target task further comprises a memory identity (ID) of the third buffer, and wherein the instructions further cause the processor to be configured to obtain, based on the memory ID, the buffer entry.

12. The computer device of claim 11, wherein the target task is the buffer application task, and wherein the instructions further cause the processor to be configured to:
determine the memory size and the memory location from the buffer entry;
determine a device memory for the third buffer based on the memory size and the memory location; and
update the memory address based on the device memory.

13. The computer device of claim 11, wherein the target task is the buffer release task, and wherein the instructions further cause the processor to be configured to:
determine, from the buffer entry, the memory address;
release a device memory corresponding to the memory address; and
delete the buffer entry.

14. The computer device of claim 11, wherein the target task is the buffer application task, and wherein the instructions further cause the processor to be configured to:
apply for the buffer entry and the memory ID;
generate an application programming interface parameter when the computer device calls an application programming interface;
fill in the buffer entry based on the application programming interface parameter, wherein the buffer memory address is a null address; and
generate the buffer application task based on the buffer entry, wherein the buffer application task comprises the memory ID.

15. A computer program product comprising computer-executable instructions for storage on a non-transitory computer-readable medium that, when executed by a processor, cause an apparatus to:
generate a target task comprising a buffer application task or a buffer release task, wherein the target task is a successive task of a first task and is a preceding task of a second task, wherein the first task and the second task are to-be-executed tasks and comprising a sequential dependency relationship between them, wherein a first buffer corresponding to the buffer application task is used when the target task is the buffer application task and the second task is executed, and wherein a second buffer corresponding to the buffer release task is used when the target task is the buffer release task and the first task is executed;
obtain a buffer entry corresponding to the target task after a preceding task of the target task is executed and before a successive task of the target task is executed, wherein the buffer entry comprises a memory size of a third buffer corresponding to the target task, a memory location of the third buffer, and a memory address of the third buffer; and execute the target task to apply for or release the third buffer.

16. The computer program product of claim 15, wherein the target task further comprises a memory identity (ID) of the third buffer, and wherein the data processing method further comprises obtaining, based on the memory ID, the buffer entry.

17. The computer program product of claim 16, wherein the target task is the buffer application task, and wherein the data processing method further comprises:

determining the memory size and the memory location from the buffer entry;

determining a device memory for the third buffer based on the memory size and the memory location; and updating the memory address based on the device memory.

18. The computer program product of claim 16, wherein the target task is the buffer release task, and wherein the data processing method further comprises:

determining the memory address from the buffer entry;

releasing a device memory corresponding to the memory address; and deleting the buffer entry.

19. The computer program product of claim 16, wherein the target task is the buffer application task, and wherein the data processing method further comprises:

applying for the buffer entry for the third buffer and the memory ID;

generating an application programming interface parameter when the computer device calls an application programming interface;

filling in the buffer entry based on the application programming interface parameter, wherein the memory address is a null address; and generating the buffer application task based on the buffer entry, wherein the buffer application task comprises the memory ID.

20. The computer program product of claim 15, wherein the target task further comprises a dependent task group identity (ID), and wherein the data processing method further comprises obtaining, based on the dependent task group ID, the buffer entry.

* * * * *